United States Patent [19]

Tominaga et al.

[11] Patent Number: 5,218,018
[45] Date of Patent: Jun. 8, 1993

[54] HYDROXYL AND CARBOXYL GROUPS-CONTAINING RESIN WITH ALICYCLIC POLYEPOXIDE

[75] Inventors: Akira Tominaga; Reiziro Nishida, both of Chigasaki; Hiroshi Inoue, Hiratuka; Motoshi Yabuta, Hatano; Yoshio Sasaki, Kanagawa; Akira Kasari, Hiratuka; Hiroshi Igarashi, Yokohama; Tohru Ozaki, Hiratuka, all of Japan

[73] Assignee: Kansai Paint Co., Ltd., Hyogo, Japan

[21] Appl. No.: 635,970

[22] Filed: Dec. 31, 1990

[30] Foreign Application Priority Data

Dec. 29, 1989 [JP] Japan .................. 1-342740
May 10, 1990 [JP] Japan .................. 2-118537
May 10, 1990 [JP] Japan .................. 2-118538
Sep. 14, 1990 [JP] Japan .................. 2-245231
Sep. 27, 1990 [JP] Japan .................. 2-255200
Sep. 27, 1990 [JP] Japan .................. 2-255410
Nov. 2, 1990 [JP] Japan .................. 2-298107

[51] Int. Cl.$^5$ .................. C08K 3/20; C08L 33/12; C08L 63/00
[52] U.S. Cl. .................. 523/412; 523/402; 523/403; 525/118; 525/438; 525/524
[58] Field of Search .................. 525/118, 438

[56] References Cited

U.S. PATENT DOCUMENTS

| 4,240,938 | 12/1980 | Kraft et al. | 525/508 |
| 4,565,859 | 1/1986 | Murai et al. | 525/523 |
| 4,786,705 | 11/1988 | Koleske | 525/510 |
| 4,927,884 | 5/1990 | Iwasawa et al. | 525/208 |
| 5,026,793 | 6/1991 | Nakai et al. | 525/476 |

FOREIGN PATENT DOCUMENTS

| 63-120727 | 5/1988 | Japan . |
| 63-189427 | 8/1988 | Japan . |
| 2202538 | 9/1988 | United Kingdom . |
| 2202598 | 9/1988 | United Kingdom . |
| 2212164 | 7/1989 | United Kingdom . |

*Primary Examiner*—Robert E. Sellers
*Attorney, Agent, or Firm*—Wenderoth, Lind & Ponack

[57] ABSTRACT

A thermosetting coating composition comprising as essential components:
(a) a hydroxyl group-containing base resin,
(b) an alicyclic polyepoxide crosslinking agent, and
(c) a catalyst selected from the group consisting of a quaternary ammonium hydroxide and a metal chelate.

11 Claims, No Drawings

HYDROXYL AND CARBOXYL GROUPS-CONTAINING RESIN WITH ALICYCLIC POLYEPOXIDE

The present invention relates to a novel thermosetting coating composition and a process of forming pigmented coating films.

As thermosetting coating composition, there has heretofore been known paints composed of a resin composition including a hydroxyl group-containing resin and an aminoaldehyde resin dissolved or dispersed in an organic solvent. However, this type of thermosetting coating compositions are disadvantageous in that not only they must be baked at temperatures no lower than 180° C. but also films formed therefrom have poor chemical characteristics such as corrosion resistance and acid resistance. In addition, problems of bubbling of coating films due to condensates (formaldehyde or the like) formed upon the baking and of environmental pollution remain to be solved. Those paints obtained by substituting the aminoaldehyde resins in the above-described conventional paints by bisphenol/epichlorohydrin type epoxy resins suffer from increase in viscosity or gelling during their storage, resulting in that they fail to give practically acceptable thermosetting coating compositions.

Overcoat coating films, particularly those for automobiles currently used in the main are thermoplastic acrylic resin/melamine resin system, thermoplastic polyester resin/melamine resin system, and the like. These paints have various problems that they reached almost a limitation in height smoothness and no further improvement thereof is considered impossible, that various performances of coating film remain to be improved and that they have insufficient curing characteristics.

Previously, we proposed a coating composition for automobiles which has excellent low temperature curing characteristics in Japanese Laid-Open Patent Publication 160879/1990. This coating composition is a silicone type coating composition obtained by blending a copolymer composed of a polysiloxane type macromonomer having a silanol group and/or an alkoxysilane group and a vinyl monomer having an oxirane group as monomer components with a metal chelate compound. When the coating composition is applied to both a metallic base coat (i.e., a blend of a paint with aluminum flake pigment) and a clear top coat and coating is finished by a two-coat-one-bake method, the resulting coating film fails to exhibit aluminum luster (i.e., being brilliant and white) because the metallic base coat is corroded by the clear top coat and the orientation of the aluminum flake pigment is altered. Further, a coating composition containing a thermosetting acrylic or polyester resin/melamine resin type resin composition as a metallic base coat is disadvantageous that curing of the clear top coat starts before curing of the metallic base coat begins, resulting in that defects such as bubbling, shrink and the like occur in the resulting coating films.

While in order to repair defects when finished coating films are defective, it is usually the case that the same types of metallic base coat and of clear top coat are recoated, adhesion between the coating films, i.e., between the clear top coat and the recoated metallic base coat, is insufficient in the case where the above-described silicone type coating composition is used. This problem remains to be solved yet.

According to one aspect of the present invention, there is provided a thermosetting coating composition comprising as essential components:
(a) a hydroxyl group-containing base resin,
(b) an alicyclic polyepoxide crosslinking agent, and
(c) a catalyst selected from the group consisting of quaternary ammonium hydroxide and a metal chelate.

According to another aspect of the present invention, there is provided a process of forming a pigmented coating film by sequentially coating (i) a pigmented base coat and (ii) a clear top coat on a substrate, wherein the pigmented base coat (i) is formed using a coating composition for a base coat comprising (a) a hydroxyl group-containing base resin,
(b) an alicyclic polyepoxide crosslinking agent,
(c) a catalyst selected from the group consisting of quaternary ammonium hydroxide and a metal chelate, and
(d) a metal flake powder and/or mica powder, and
wherein the clear top coat (ii) is formed using a coating composition for a clear top coat comprising as essential components:
(ii-1) a base resin having (a') a hydrolytic group directly bonded to a silicon atom and/or a silanol group, (b') a hydroxyl group and (c') an epoxy group, and
(ii-2) a curing catalyst.

The thermosetting coating composition of the present invention has a feature that the reaction between the hydroxyl group in the base resin (a) and the alicyclic epoxy group in the crosslinking agent (b) and the reaction between the alicyclic epoxy groups themselves in the crosslinking agent (b) substantially do not proceed at about room temperature in the presence of the catalyst (c) selected from quaternary ammonium hydroxide and a metal chelate, but the reactions between the functional groups proceed abruptly by baking it at a relatively low temperature, for example, about 100° C. Therefore, the coating composition of the present invention is excellent in storage stability and low temperature curing characteristics.

Because the above-described reactions are ionic reactions, there is no fear of the occurrence of by-products unlike the condensation reaction between hydroxyl groups and amino groups in the conventional coating composition containing a hydroxyl group-containing resin and an aminoaldehyde resin. Therefore, coating films formed using the coating composition of the present invention have excellent decorative properties as well as superior physical and chemical properties without any defects such as bubbling and shrink of the coating film.

In the process of forming a pigmented coating film according to the present invention, the above-described thermosetting coating composition of the invention is used as a coating composition for a base coat to form a base coat, and then a coating composition for a clear top coat comprising a base resin having a hydrolytic group directly bonded to a silicon atom and/or a silanol group, a hydroxyl group and epoxy group and a curing catalyst is coated on the resulting base coat to form a clear top coat on the surface of the base coat. The process of forming a pigmented coating film according to the invention can give rise to multi-layer coating films which have excellent properties as follows.

(1) In a two-coat-one-bake coating system, there is no fear of altering pattern control of metal flake or mica powder, or reversion unevenness of metallic coating, in the pigmented base coat due to the coating composition for clear coat, resulting in that multi-layer coating films can be formed which are excellent in decorative properties.

(2) Interphase adhesion between the pigmented base coat and the clear top coat is excellent. As a result, multi-layer coating films can be formed which has excellent recoating property and is suitable for two-coat-two-bake coating system and the like.

(3) Because no bubbling nor shrink occurs upon curing, multi-layer coating films can be formed which have excellent finished appearance.

Hereafter, the coating composition and process of forming pigmented coating film according to the present invention will be explained in greater detail.

Hydroxyl group-containing basic resin (a):

The hydroxyl group-containing base resin (a) in the thermosetting coating composition of the invention is not limited particularly and any resin may be used that is known in the field of coating composition such as those based on vinyl type resins, polyester type resins and polyether type resins. Representative examples of such resins include the following:

(1) As the hydroxyl group-containing vinyl type resin, there can be cited, for example, polymers obtained by (co)polymerizing at least one of hydroxyl group-containing monomer such as hydroxyethyl (meth)acrylate, hydroxypropyl (meth)acrylate, hydroxybutyl (meth)acrylate, polycaprolactonediol mono(meth)acrylate and polyoxyethylene glycol (meth)acrylate; and optionally one or more of other radical polymerizable unsaturated group-containing monomer having no functional group that reacts with a hydroxyl group, such as methyl (meth)acrylate, ethyl (meth)acrylate, isopropyl (meth)acrylate, n-butyl (meth)acrylate, 2-ethylhexyl (meth)acrylate, acrylonitrile, acrylamide, styrene, vinyltoluene, vinyl acetate, isopropyl vinyl ether, n-butyl vinyl ether or methoxyethyl vinyl ether.

(2) As the hydroxyl group-containing polyester type resin, there can be cited, for example, hydroxyl group-containing polyester resins obtained by condensation of a polyol component such as trimethylolethane, trimethylolpropane, pentaerythritol, glycerol, ethylene glycol, propylene glycol, 1,3-butylene glycol, neopentyl glycol or 1,6-hexanediol with a polycarboxylic acid component such as phthalic acid (anhydride), isophthalic acid, tetrahydrophthalic acid, hexahydrophthalic acid, adipic acid or trimellitic acid (anhydride); hydroxyl group-containing modified polyester type resins obtained by modifying the above polyester resins with a fatty acid or an epoxy resin; and hydroxyl group-containing modified polyester resins obtained by grafting a (meth)acrylic type monomer on the above polyester resins; esterified resins obtained by modifying bisphenol/epichlorohydrin type epoxy resins with a fatty acid or the like; etc.

(3) As the hydroxyl group-containing polyether type resin which can be used suitably, there can be cited, for example, those resins obtained by polymerizing bisphenol/epichlorohydrin type epoxy resins in the presence of a catalyst.

Among various resins used as the above hydroxyl group-containing base resin (a), the hydroxyl group-containing vinyl type resins obtained by (co)polymerizing at least one of hydroxyl group-containing monomers and optionally one or more of other monomers referred to in (1) above are particularly preferred because they give coating films which are excellent in decorative properties, weatherability and the like.

The hydroxyl group-containing base resin (a) has a hydroxyl value of generally in the range of about 10 to about 500, preferably about 20 to about 200. If the hydroxyl value is less than about 10, there are observed tendencies that the curability of coating film decreases and performances of coating film such as hardness and flexing resistance also decrease. On the other hand, if the hydroxyl value exceeds about 500, performances of coating film such as water resistance and corrosion resistance tend to decrease. Therefore, it is undesirable that the resins have hydroxyl value outside the above-mentioned range.

It is advantageous to use a base resin having a carboxyl group in addition to a hydroxyl group as the above hydroxyl group-containing base resin (a) in the coating composition of the present invention not only because in this case the base resin can be dissolved or dispersed in water to make it possible to produce an aqueous coating composition, but also because reaction between the carboxyl group and the epoxy group in the crosslinking agent (b) and reaction between the resulting hydroxyl group and the epoxy group occur at the same time, which make it possible to form coating films having high crosslinking densities, resulting in that coating films can be obtained which have excellent chemical and physical properties.

As the base resin having both hydroxyl and carboxyl groups, there can be used, for example, those resins based on vinyl type resins, polyester type resins, polyether type resins and the like. Representative examples of such resins include the following:

(1) As the vinyl type resins, there can be cited, for example, those polymers which can be obtained by copolymerizing at least one of the above-described hydroxyl group-containing monomers, at least one of carboxyl group-containing monomers such as acrylic acid, methacrylic acid, 2-carboxyethyl acrylate, 2-carboxyethyl methacrylate, 2-carboxypropyl acrylate, 2-carboxypropyl methacrylate, maleic acid, itaconic acid and fumaric acid, and optionally one or more of the above-described other radical polymerizable unsaturated monomers;

(2) As the polyester type resins, there can be cited, for example, those polyesters which can be obtained by condensing the above-described polyol component with the above-described polycarboxylic acid component so that the resulting polyester can contain both hydroxyl and carboxyl groups, modified resins which can be obtained by modifying the thus-obtained polyester resin with a fatty acid, an epoxy resin or an acrylic resin, those resins which can be obtained by addition-polymerizing an acid anhydride such as maleic anhydride to an esterified product obtained by modifying a bisphenol/epichlorohydrin type epoxy resin with a fatty acid; and (3) As the polyether type resins, there can be used those resins which can be obtained by reacting a bisphenol/epichlorohydrin type epoxy resin with a polycarboxylic acid such as maleic anhydride or maleic anhydride.

Among the above-described base resins having both hydroxyl and carboxyl group, the vinyl type resin containing both hydroxyl and carboxyl groups referred to in (1) above are particularly preferred because they can give rise to coating films which are excellent in their decorative properties and weatherability.

The base resins having both hydroxyl and carboxyl groups have an acid value in the range of generally about 1 to about 100, preferably about 10 to about 80 and a hydroxyl value of generally about 10 to about 500, preferably about 20 to about 200. If the acid value is less than about 1, there is a fear that the adherability of the resulting coating film would decrease, thus aggravating the corrosion resistance, flexing resistance, weatherability and the like of the coating film. On the hand, if the acid value exceeds about 100, the coating composition tends to have poor storage stability and the resulting coating film tends to be poor in water resistance and the like. Therefore, it is undesirable that the acid value be outside the above range. Also, the hydroxyl value outside the above range is undesirable because if the hydroxyl value is less than about 10, the resulting coating film tends to have a decreased curability and performances of coating film such as hardness and flexing resistance tend to decrease while if the hydroxyl value exceeds about 500, performances of coating film such as water resistance and corrosion resistance tend to decrease.

Further, in the case where an aqueous coating composition is prepared using the base resin having both hydroxyl and carboxyl groups, if the acid value of the base resin is less than about 1, it is difficult to obtain an aqueous composition while if the acid value exceeds about 100, the resulting aqueous coating composition has a decreased storage stability and the coating film formed therefrom has poor performance such as decreased corrosion resistance. Therefore, the acid value outside the above range is undesirable.

The above-described base resin (a) have a number average molecular weight in the range of generally about 1,000 to about 100,000, preferably about 2,000 to about 80,000, and a softenning temperature in the range of generally no higher than 130° C, preferably no higher than about 115° C. If the number average molecular weight is less than about 1,000, performances of coating film such as hardness, flexing resistance and corrosion resistance tend to decrease while it exceeds about 100,000, there is observed a tendency that the appearance of coating film such as smoothness is aggravated. On the other hand, if the softenning temperature exceeds about 130° C., the appearance of coating film such as smoothness tends to be aggravated.

Further, the base resin (a) may have other functional groups such as a phenolic hydroxyl group in addition to the above-described hydroxyl and carboxyl groups, if desired. There is no limitation as to how to introduce the other functional groups than hydroxyl and carboxyl groups and any process known per se can be used. For example, phenolic hydroxyl groups can be introduced by carrying out the copolymerization using bisphenol-modified (meth)acrylates as the monomer component for the above-described vinyl type resins.

Alicyclic polyepoxide crosslinking agent (b):

The alicyclic polyepoxide crosslinking agent (b) which can be used advantageously in the thermosetting coating composition of the invention includes a polyepoxy compound having at least two per molecule of epoxy groups selected from an epoxy group present on an alicyclic hydrocarbon ring and/or an epoxy group directly bonded to a carbon atom constituting an alicyclic hydrocarbon ring. The alicyclic hydrocarbon ring may be of a small member such as 3-membered to 7-membered or more. The ring may be monocyclic or polycyclic. Further, the ring may be a bridged hydrocarbon ring. The epoxy group present on an alicyclic hydrocarbon ring includes, for example, a group represented by formula:

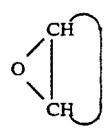

and examples of the epoxy group directly bonded to a carbon atom constituting an alicyclic hydrocarbon ring include a group represented by formula:

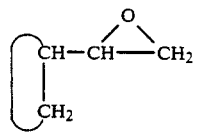

As the alicyclic polyepoxide crosslinking agent (b), there can be used those which are commercially available, and specific examples of such alicyclic polyepoxide crosslinking agent include the following compounds:

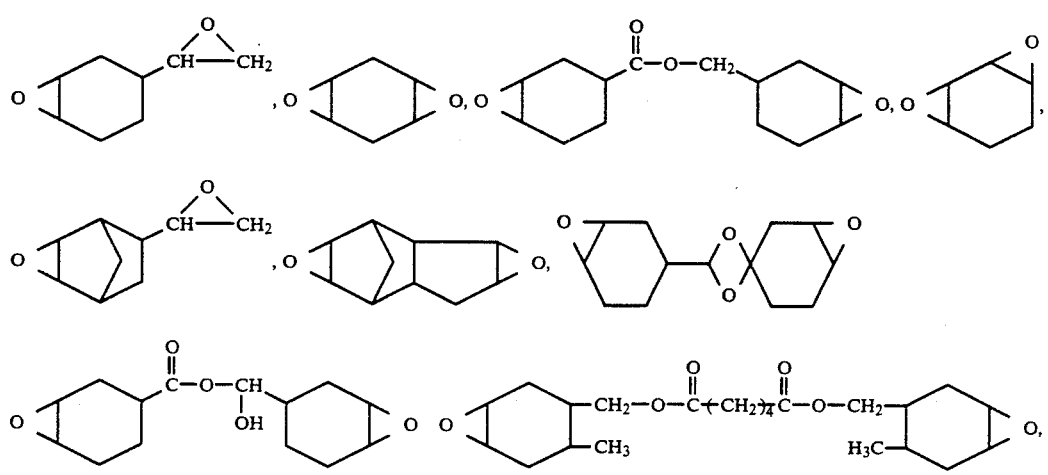

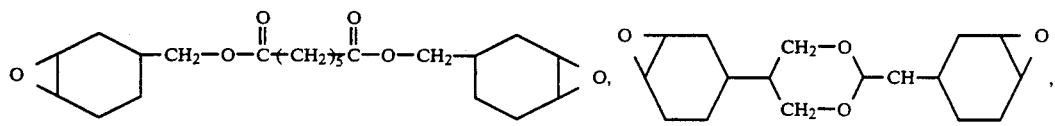

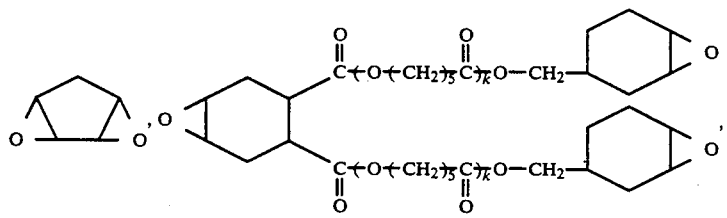

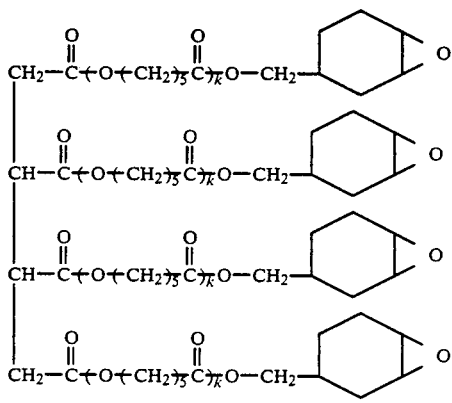

(wherein K is 0 or an integer of 1 to 15)

Also, those compounds having repeating units represented, for example, by formulae (1), (2) and (3) below, respectively, can be used as the alicyclic polyepoxide crosslinking agent.

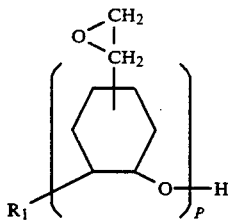 (1)

wherein $R_1$ is an organic residue having an active hydrogen, and p is 2 to 100;

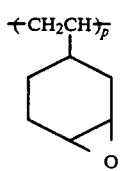 (2)

wherein p has the same meaning as defined above;

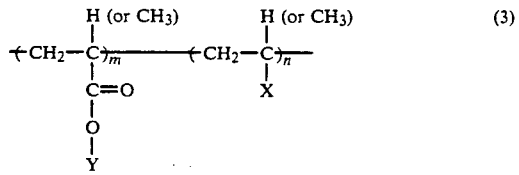 (3)

wherein Y is an alicyclic epoxy residue, X is

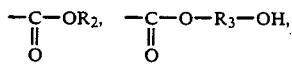

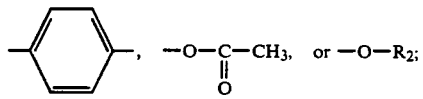

$R_2$ is a $C_{1-18}$-alkyl group or a cycloalkyl group; $R_3$ is a $C_{1-6}$ alkylene group; n is 0 to 100; and m is 5 to 100.

The alicyclic epoxy residue (Y) in the above-described repeating unit represented by formula (3) includes, for example, organic groups having alicyclic epoxy groups such as

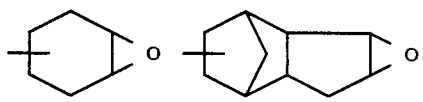

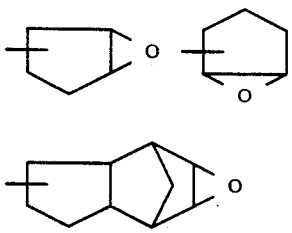

respectively.

The "$C_{1-18}$-alkyl group" represented by X may be of a straight chain or branched type and specific examples thereof include methyl, ethyl, n-propyl, isopropyl, n-butyl, isobutyl, sec-butyl, tert-butyl, n-pentyl, isopentyl, neopentyl, n-hexyl, n-heptyl, n-octyl, 2-ethylhexyl, n-nonyl, n-decyl, n-dodecyl, n-tridecyl, n-tetradecyl, n-hexadecyl, n-octadecyl, etc. groups. The "cycloalkyl group" represented by X may contain generally 3 to 7 carbon atoms and specific examples thereof include cyclopropyl, cyclobutyl, cyclohexyl, etc. groups.

The "$C_{1-6}$-alkylene group" represented by $R_3$ may be of a straight chain or branched type and specific examples thereof include methylene, ethylene, n-propylene, methylethylene, n-butylene, isobutylene, dimethylethylene, etc. groups.

As the compounds having the repeating units (1), (2) and (3), respectively, described above, there can be used those compounds described in Japanese Laid-Open Patent 209667/1989, for example, the following ones.

As the compound having the repeating unit represented by formula (1), there can be cited those compounds prepared by ring opening polymerization of 4-vinylcyclohexene-1-oxide using an organic compound having an active hydrogen to obtain a polycyclohexene oxide ring opening polymerization product and epoxidizing the product with an oxidizing agent such as a peracid or a hydroperoxide. As the organic compound having an active hydrogen used herein, there can be cited, for example, alcohols such as monohydric alcohols, e.g., methanol, ethanol, propanol, pentanol, hexanol, benzyl alcohol and cyclohexanol, and polyhydric alcohols, e.g., ethylene glycol, diethylene glycol, triethylene glycol, propylene glycol, butanediol, pentanediol, hexanediol, neopentyl glycol, glycerol, trimethylolpropane, pentaerythritol and dipentaerythritol; phenols such as phenol, cresol, bisphenol A and bisphenol F; carboxylic acids such as formic acid, acetic acid, maleic acid, adipic acid, dodecanedioic acid, trimellitic acid, phthalic acid, isophthalic acid and terephthalic acid; and the like.

The above-described ring opening polymerization reaction can be carried out usually in the presence of a catalyst, for example, bases such as ethylamine, propylamine, potassium hydroxide and pyridine; acids such as formic acid, acetic acid, sulfuric acid and hydrochloric acid; alkali metal alcoholates such as sodium methylate; Lewis acids and their complexes such as boron tribromide, zinc chloride and aluminum chloride; organometals such as triethylaluminum at a temperature in the range of generally about $-70°$ to about $200°$ C., preferably about $-30°$ C. to about $100°$ C.

The compound having the repeating unit represented by formula (1) is preferably those which have a number average molecular weight in the range of generally about 400 to about 10,000, particularly about 700 to about 50,000.

As the compound having a repeating unit represented by formula (1), there can be cited, for example, EHPE-3150, EHPE-3100 and EHPE-1150 (trademarks for products produced by DAICEL CHEMICAL INDUSTRY CO., LTD.).

As the compound having the repeating unit represented by formula (2), there can be exemplified those compounds obtained by radical polymerization of vinyl 3,4-epoxycyclohexyl. The radical polymerization reaction can be carried out by the same process and under the same conditions as those in the polymerization reaction based on polymerizable unsaturated bonds in ordinary acrylic resins, vinyl resins and the like. As an example of such polymerization reaction, there can be cited a method in which each monomer component is dissolved or dispersed in an organic solvent, and the resulting solution or dispersion is heated in the presence of a radical polymerization initiator at a temperature of about $60°$ to $180°$ C. while stirring. The reaction time is usually about 1 to 10 hours. As the organic solvent, there can be used, for example, alcohol type solvents, ether type solvents, ester type solvents and hydrocarbon type solvents. When the hydrocarbon type solvents are used, it is preferred to use other solvents in combination from the viewpoint of solubility. Any radical polymerization initiators that are usually used may be employed. Specific examples thereof include peroxides such as benzoyl peroxide and t-butyl peroxy-2-ethylhexanoate; azo compounds such as azoisobutyronitrile and azobisdimethylvaleronitrile; and the like.

Examples of the compound having the repeating unit represented by formula (3) include those compounds which can be prepared by radical polymerization reaction between a compound having at least one alicyclic epoxy group and at least one polymerizable unsaturated group in the same molecule (hereafter, sometimes abbreviated as "polymerizable epoxy monomer") and a compound represented by formula $CH_2=CHX$ or $CH_2=CCH_3X$ wherein X has the same meaning as defined above).

As the "polymerizable epoxy monomer" described above, there can be cited, for example, the following compounds represented by formulae (4) to (15) below.

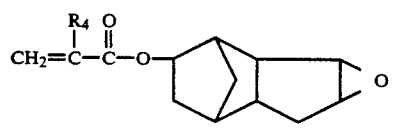 (4)

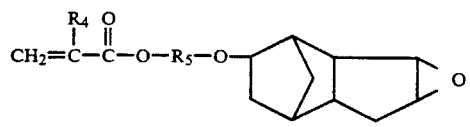 (5)

-continued

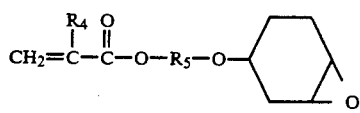 (6)

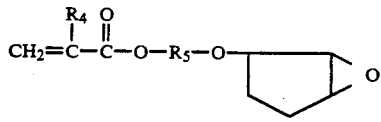 (7)

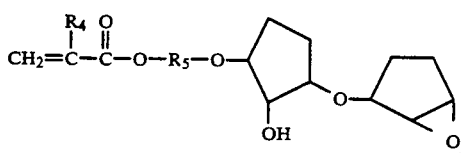 (8)

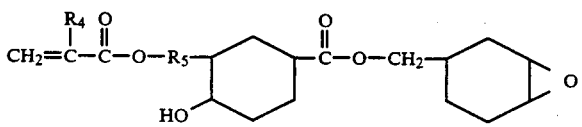 (9)

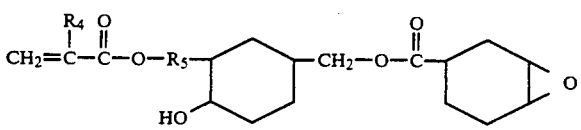 (10)

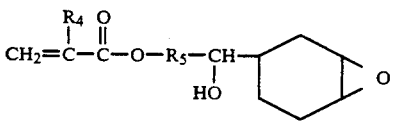 (11)

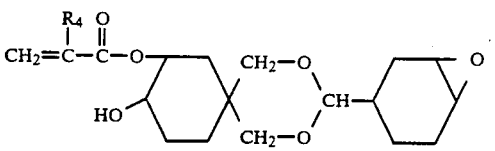 (12)

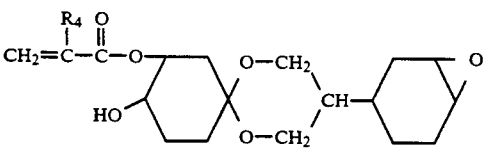 (13)

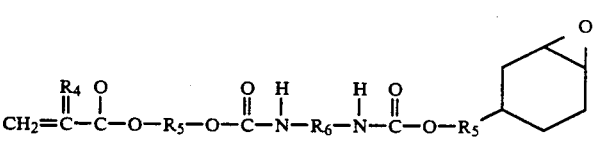 (14)

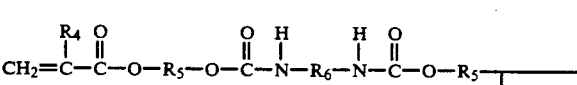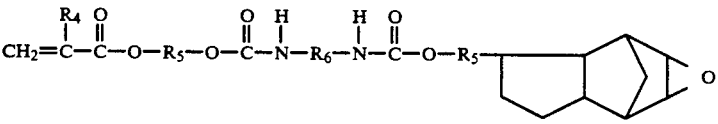 (15)

In the above formulae, $R_4$ is a hydrogen atom or a methyl group; $R_5$ is a divalent aliphatic saturated hydrocarbon group having 1 to 6 carbon atoms; and $R_6$ is a divalent hydrocarbon group having 1 to 10 carbon atoms.

In the above-described polymerizable epoxy monomer, examples of the divalent aliphatic hydrocarbon group having 1 to 6 carbon atoms represented by $R_5$ include straight chain or branched alkylene groups such as methylene, ethylene, propylene, tetramethylene, ethylethylene, pentamethylene and hexamethylene groups. As the divalent hydrocarbon group having 1 to 10 carbon atoms represented by $R_6$, there can be cited, for example, methylene, ethylene, propylene, tetramethylene, ethylethylene, pentamethylene, hexamethylene, polymethylene, phenylene,

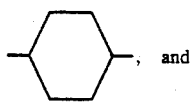, and

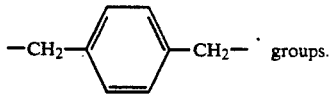 groups.

Specific examples of the polymerizable epoxy monomer are preferably 3,4-epoxycyclohexylmethyl acrylate and 3,4-epoxycyclohexylmethyl methacrylate. These compounds are put on the market and commercially available under METHB and AETHB (trade names for products by DAICEL CHEMICAL INDUSTRY CO., LTD.).

As the compound represented by formula $CH_2=CHX$ or $CH_2=CCH_3X$ above wherein X has the same meaning as defined above, there can be cited, for example, alkyl (meth)acrylates such as methyl (meth)acrylate, ethyl (meth)acrylate, propyl (meth)acrylate, isopropyl (meth)acrylate, butyl (meth)acrylate, hexyl (meth)acrylate, octyl (meth)acrylate and lauryl (meth)acrylate; hydroxyalkyl (meth)acrylates such as hydroxyethyl (meth)acrylate and hydroxypropyl (meth)acrylate; alkyl vinyl ethers such as propyl vinyl ether, butyl vinyl ether, isohexyl vinyl ether and cyclohexyl vinyl ether; vinyl aromatic compounds such as α-methylstyrene; vinyl acetate and the like.

The radical polymerization reaction between the polymerizable epoxy monomer and the compounds represented by the above formulae can be carried out by radical polymerization reaction similar to that described in connection with the compound having the repeating unit represented by formula (2) above.

The compounds having the repeating units represented by formulae (2) and (3), respectively, are preferably those having a number average molecular weight in the range of generally about 3,000 to about 100,000 and particularly about 4,000 to about 50,000.

Further, as the alicyclic polyepoxide crosslinking agent (b) which is used in the thermosetting coating composition of the present invention, there can also be employed advantageously those which can be prepared by reacting a hydroxyl group-containing alicyclic epoxy compound having at least one of epoxy group present on an alicyclic hydrocarbon ring and/or an epoxy group directly bonded to a carbon atom constituting an alicyclic hydrocarbon ring and at least one hydroxyl group with a polyisocyanate compound.

Examples of the hydroxyl group-containing alicyclic epoxy compound include those compounds represented by formulae (16) to (23) below, respectively.

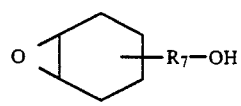 (16)

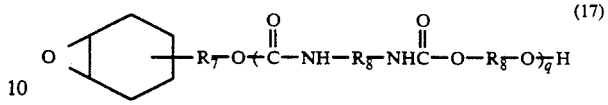 (17)

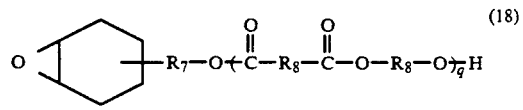 (18)

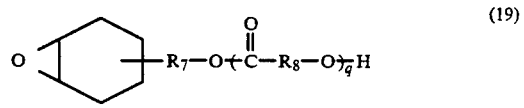 (19)

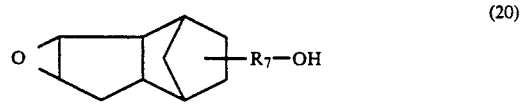 (20)

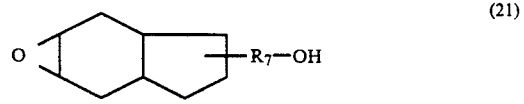 (21)

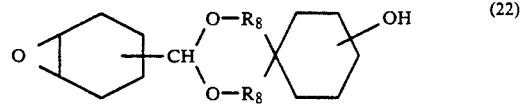 (22)

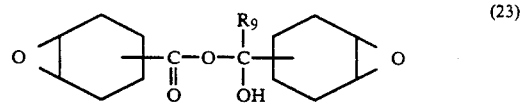 (23)

wherein $R_7$ is a divalent $C_{1-20}$-hydrocarbon group; $R_8$'s, which are the same or different, each represent a divalent $C_{1-8}$ hydrocarbon group; $R_9$ is a hydrogen atom or a methyl group; and q is an integer of 1 to 10.

In the above formulae, examples of the "divalent hydrocarbon group" include alkylene groups, cyclic alkylene groups, a phenylene group, substituted phenylene groups and the like. The alkylene groups may be of a straight chain type or branched type. Specific examples of the $C_{1-8}$-alkylene group include methylene, ethylene, ethylethylene, propylene, butylene, pentamethylene, hexamethylene and octamethylene. As the $C_{1-20}$-alkylene group, there can be cited, for example, decamethylene, dodecamethylene, tetradecamethylene and octadecamethylene in addition to the specific examples of the above-described $C_{1-8}$-alkylene group.

Suitable examples of the hydroxyl group-containing alicyclic epoxy compound represented by the above formulae (16) to (23) include the following compounds;

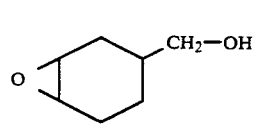

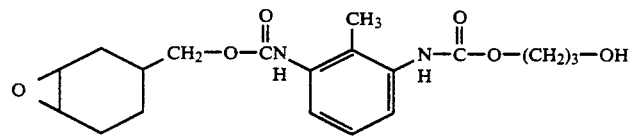

-continued

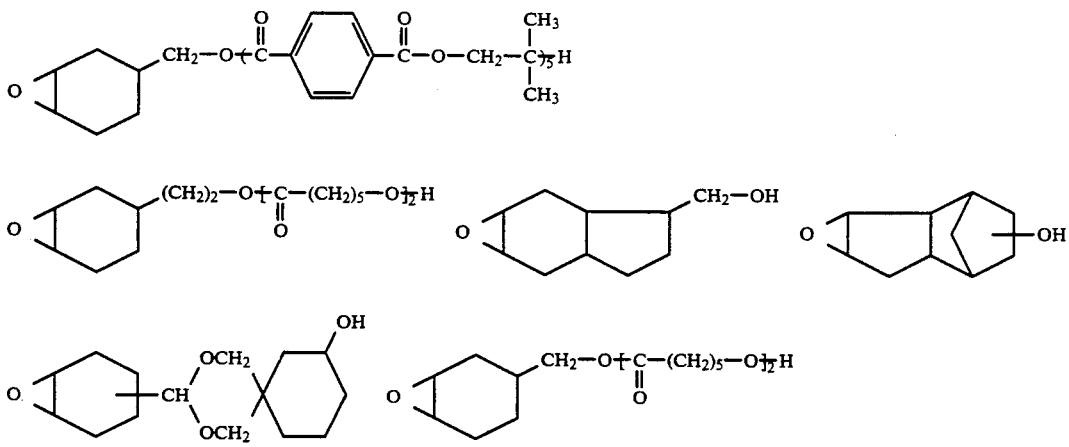

The polyisocyanate compound to be reacted with the hydroxyl group-containing alicyclic epoxy compound in order to obtain the alicyclic polyepoxide crosslinking agent (b) is a compound which has at least two isocyanate groups in the molecule. The polyisocyanate compound may be of any type such as aliphatic type, alicyclic type, aromatic type and aromatic-aliphatic type. Examples thereof include aliphatic diisocyntate compounds such as tetramethylene diisocyanate, hexamethylene diisocyanate, trimethylhexamethylene diisocyantae and decamethylene diisocyanate; alicyclic diisocyanates such as isophorone diisocyanate, hydrogenated xylylene diisocyanate and hydrogenated diphenylmethane diisocyanate; aromatic diisocyanates such as tolylene diisocyanate and diphenylmethane diisocyante; aromatic-aliphatic diisocyanates such as xylylene diioscyanate and tetramethylxylylene diisocyanate; and the like.

Besides those described above, those polyisocyanate compounds such as adducts of the above-described diisocyanate compound with a polyol (for example, ethylene glycol, trimethylolpropane, etc.), and biuret or isocyanurate compounds of the above-described aliphatic or alicyclic diisocyanate compounds can also be used. Among them, the aliphatic type, alicyclic type and aromatic-aliphatic type polyisocyanate compounds are preferred because these polyisocyanates show less denaturation and give rise to coating films having excellent weatherability.

The reaction between the hydroxyl group-containing alicyclic epoxy compound and the polyisocyanate compound can be carried out by the process which is known per se in which hydroxyl groups and isocyanate groups are reacted with each other. For example, the reaction can be performed by continuing reaction of a mixture of the hydroxyl group-containing epoxy compound and the polyisocyanate compound in a nitrogen atmosphere until substantially all the isocyanate groups are consumed, for example, at a temperature of about 180° C. for about 10 minutes to about 24 hours. The mixture may be used in the form of an organic solvent solution as dissolved or dispersed in an inert organic solvent such as an ester type, ketone type, ether type or aromatic type one which contain no active hydrogen. In the reaction system, organic metals such as dibutyltin laurate, dibutyltin 2-ethylhexanoate, lead octenoate and zinc naphthenate can be blended as a reaction catalyst.

The blend ratio of the hydroxyl group-containing alicyclic epoxy compound to the polyisocyanate compound is not limited strictly and generally it is desirable to blend them so that the equivalent ratio of the hydroxyl group in the epoxy compound to the isocyanate group in the polyisocyanate compound can be in the range of about 0.9:1 to about 1.1:1. Examples of the reaction product between the hydroxyl group-containing alicyclic epoxy compound and the polyisocyanate compound include the following compounds:

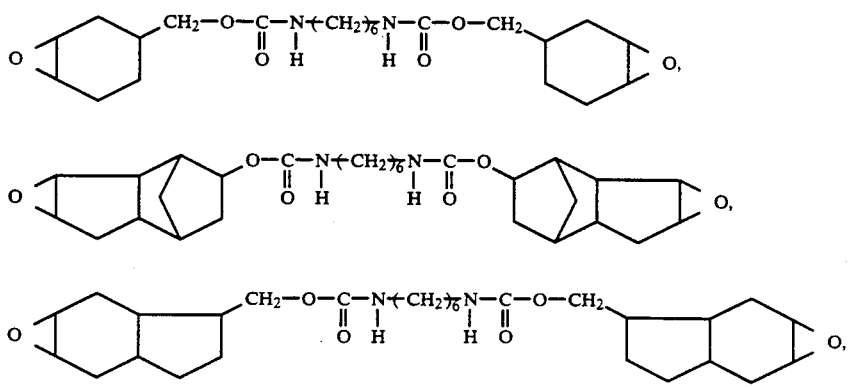

-continued

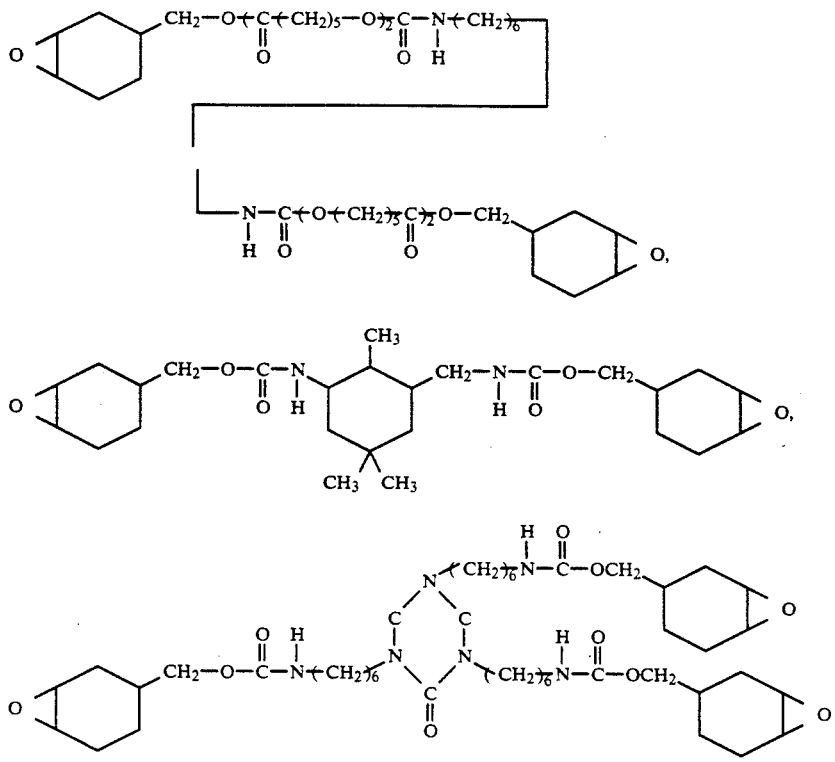

and the like.

The reaction products between the hydroxyl group-containing epoxy compound and the polyisocyanate compound are preferably those having a number average molecular weight in the range of generally about 200 to about 20,000, particularly about 300 to about 10,000.

The alicyclic polyepoxide crosslinking agent contains the alicyclic epoxy group in the range of generally no less than 2 on average, preferably 2 to 2,000 on average, more preferably 2 to 400 on average, per mole of the agent. If the amount of the epoxy group is less than 2 on average per molecule, the curability of the resulting coating film decreases and performances such as hardness, flexing resistance and corrosion resistance are aggravated.

The alicyclic polyepoxide crosslinking agent which has a softening temperature of no higher than about 130° C., preferably no higher than about 115° C. is favorable. The softenning temperature exceeding about 130° C. is undesirable because there is a fear that the resulting coating film has a decreased smoothness.

In the present invention, it is desirable that the above-described base resin (a) and the alicyclic polyepoxide crosslinking agent (b) are blended in a proportion in such a range that the base resin (a) occupies generally about 40 to about 97% by weight, preferably about 50 to about 95% by weight, more preferably about 60 to about 90% by weight, and the crosslinking agent (b) occupies about 3 to about 60% by weight, preferably about 5 to about 50% by weight, more preferably about 10 to about 40% by weight, both based on the sum of the base resin (a) and the crosslinking agent (b). Proportions outside the above range is undesirable because there is a fear that the resulting coating film has a decreased curability and its performances such as water resistance, corrosion resistance and flex resistance are aggravated.

Catalyst (c):

As the quaternary ammonium hydroxide which is used as a catalyst in the thermosetting coating composition of the present invention, there can be used a compound represented by formula:

$[R_{10}R_{11}R_{12}R_{13}N]\oplus OH\ominus$ wherein $R_{10}$, $R_{11}$, $R_{12}$ and $R_{13}$, which are the same or different, each represent a monovalent hydrocarbon group.

The monovalent hydrocarbon group is not limited particularly, and includes preferably a $C_{1-18}$-alkyl group, a $C_{3-7}$-cycloalkyl group, an aryl group, an aralkyl group and the like. As the $C_{1-18}$-alkyl group and the $C_{3-7}$-cycloalkyl group, the above-described specific groups may be used. The aryl group may be monocyclic or polycyclic and examples thereof include phenyl, toluyl, xylyl, naphthyl, etc. groups. The aralkyl group is an alkyl group substituted with the above-described aryl group and examples thereof include benzyl, phenethyl, etc, groups.

The monovalent hydrocarbon group may be substituted with a hydroxyl group, and the substituted monovalnet hydrocarbon group includes, for example a hydroxyalkyl group.

As the quaternary ammonium hydroxide, there can be cited, for example, tetramethylammonium hydroxide, tetraethylammonium hydroxide, tetrapropylammonium hydroxide, tetrabutylammonium hydroxide, tetrapentylammonium hydroxide, tetraisoamylammonium hydroxide, tetradodecylammonium hydroxide, methyltriethylammonium hydroxide, ethyltrimethylammonium hydroxide, tetradecyltrimethylammonium hydroxide, monohydroxyethyltrimethylammonium hydroxide, monohydroxyethyltriethylammonium hydroxide, dihydroxyethyl-dimethylammonium hydroxide, dihydroxyethyldiethylammonium hydroxide, trihydroxyethylmonomethylammonium hydroxide, trihydroxyethylmonoethylammonium hydroxide, benzyltrimethylammonium hydroxide, benzyltriethylammonium hydroxide, benzylmethyldiethylammonium hydroxide and cyclohexyltrimethyl-ammonium hydroxide.

Among these compounds, preferred are tetraalkylammonium hydroxides, particularly tetramethylammonium hydroxides, tetraethylammonium hydroxide and the like because they are available industrially. If desired, the quaternary ammonium hydroxide may be partially or completely modified or neutralized with an organic acid such as formic acid, acetic acid, hydroxyacetic acid or glycolic acid; an inorganic acid such as hydrochloric acid; a Lewis acid such as boron fluoride, antimony fluoride or arsenic fluoride; or the like.

As the metal chelate catalyst, there can be used, for example, an aluminum chelate compound, a titanium chelate compound, a zirconium chelate compound, a vanadium chelate compound, an iron chelate compound, a zinc chelate compound and a tin chelate compound. In particular, the aluminum chelate compound is preferred because coating films having excellent curability and causing less coloring can be obtained therewith. Particularly preferred metal chelate compound is those formed using among others $\beta$-diketones or acetoacetates which can form keto-enol tautomers as a chelating agent.

As the $\beta$-diketones used the chelating agent, there can be cited, for example, acetylacetone, benzoylacetone and dibenzoyl-methane. The acetoacetates include, for example, alkyl acetoacetates such as methyl acetoacetate, ethyl acetoacetate, propyl acetoacetate and butyl acetoacetate.

Preferred examples of the metal chelate compound include the following compounds: aluminum chelate compounds such as trisacetylacetonatoaluminum, trisbenzoylacetonatoaluminum, trisethylacetoacetatoaluminum, trispropylacetoacetatoaluminum and acetylacetonatobisethylacetoacetatoaluminum; zirconium chelate compounds such as tetrakisacetylacetonatozirconium, tetrakis-ethylacetoacetatozirconium, and tetrakispropylacetoacetato-zirconium; titanium chelate compounds such as tetrakisacetyl-acetonatotitanium and tetrakisethylacetoacetatotitanium; and the like. Among these compounds, trisacetylacetonatoaluminum, trisbenzoylacetonatoaluminum, trisethylacetoacetatoaluminum and the like are particularly preferred.

The catalyst (c) selected from the quaternary ammonium hydroxide and the metal chelate compound described above may be blended in an amount in the range of generally about 0.01 to about 10 parts by weight, preferably about 0.1 to about 7 parts by weight, more preferably about 0.1 to 5 parts by weight, per 100 parts by weight of the sum of the base resin (a) and the alicyclic polyepoxide crosslinking agent (b). If the blend amount is less than about 0.01 part by weight, there is a fear that the curability of the resulting coating film decreases and the performances such as water resistance, corrosion resistance and flexing resistance of the coating film are aggravated. On the other hand, if the blend amount is more than about 10 parts by weight, the effect of promoting curing is lessened, resulting in economical disadvantages.

Preparation of coating composition:

The thermosetting coating composition of the present invention can be formulated preferably in the form of an organic solvent type coating composition containing an organic solvent as a main medium or of an aqueous coating composition containing water as a main medium.

The organic solvent type coating composition can be obtained, for example, by mixing a solution of the base resin (a) dissolved or dispersed in an organic solvent with the crosslinking agent (b) and the catalyst (c). The crosslinking agent (b) and the catalyst (c) can be used in the state of a solution dissolved or dispersed in the organic solvent. The organic solvent which can be used is preferably those which are substantially inert to the base resin (a), the crosslinking agent (b) and the catalyst (c). Specific examples thereof include alcohol type solvents such as methanol, ethanol, propanol, butanol, methylcellosolve, ethylcellosolve and butylcellosolve; ether type solvents such as ethylene glycol diethyl ether and diethlene glycol dimethyl ether; ketone type solvents such as acetone, methyl ethyl ketone, methyl isobutyl ketone and cyclohexanone; ester type solvents such as ethyl acetate, propyl acetate and butyl acetate; aromatic hydrocarbon type solvents such as toluene and xylene; and the like.

The aqueous coating composition can be prepared as follows. That is, when the quaternary ammonium hydroxide is used as the catalyst (c), it can be obtained by a mixture of the base resin (a), the crosslinking agent (b), the quaternary ammonium hydroxide (c) and optionally a neutralizing agent well blended is dissolved or dispersed in water. On the other hand, when the metal chelate is used as the catalyst (c), the coating composition can be obtained by a mixture of the base resin (a), the crosslinking agent (b), the metal chelate and a neutrallizing agent well blended is dissolved or dispersed in water. On this occasion, the base resin (a) can be used after it is dissolved or dispersed in a hydrophilic organic solvent. The hydrophilic organic solvent is not limited particularly, and any organic solvent may be used so far as it is substantially inert to the base resin (a), the crosslinking agent (b) and the catalyst (c) and it can be dissolved in or it is miscible with water. Specific examples thereof include alcohol type solvents such as methanol, ethanol, propanol, methylcellosolve, ethylcellosolve and butylcellosolve; ether type solvents such as ethylene glycol diethyl ether and ethylene glycol dimethyl ether; ketone type solvents such as acetone; ester type solvents such as sorbitol acetate and methylcellosolve acetate; and the like. As the neutralizing agent, there can be cited, for example, ammonia, trimethylamine, triethylamine, tributylamine, dimethylethanol-amine, diethylethanolamine, dimethylpropanolamine, methyldiethanolamine, ethyldiethanolamine and triethanolamine. These neutralizing agents can be blended in a proportion in the range of usually about 0.2 to 1.5 equivalents, preferably about 0.4 to 1.2 equivalents per equivalent of carboxyl group in the base resin (a).

The thermosetting coating composition may contain various additives for coating composition, such as color pigments, fillers, flowability adjustors, ultraviolet absorbents, which are known per se. As the color pigment, there can be cited, for example, titanium oxide, carbon black, quinacridone, pigment red, phthalocyanin blue, phthalocyanin green, aluminum flake, nickel flake, copper flake, brass flake, pearl mica and color mica. As the filler, there can be used, for example, barium sulfate, calcium carbonate and clay. Examples of the flowability adjustor include silica powder and fine particles of polymers. As the ultraviolet absorbent, there can be cited, for example, benzophenone type ones, triazole type ones and formanilide.

Process of forming coating films:

The thermosetting coating composition provided by the present invention can be used for forming surface protection films on various substrates.

The process of forming coating films using the thermosetting coating composition of the invention is not limited particularly, and can be carried out by coating the coating composition on the surface of a substrate by various means such as electrodeposition coating (aqueous), spray coating, dip coating, roll coating and brush coating, and drying it. The thickness of coating films is not limited particularly. Usually, thickness in the range of 10 to 100 μm are considered to be sufficient. The coating films can be dried usually for about 30 minutes at about 100° C. or for about 10 minutes at about 180° C. The substrate on which the coating composition is applied is not limited particularly. The coating composition can be applied to a wide variety of metals, preferably steel, aluminum, alumite, copper, plated steel which is a steel on the surface of which is plated with zinc, tin, chrome, aluminum or the like, a surface treated steel whose surface is chemically treated with chromic acid or phosphoric acid or electrolytically treated.

The thermosetting coating composition of the invention can be used advantageously as a coating composition for a pigmented base coat, particularly in a pigmented multi-layer coating film formed by sequentially applying a pigmented base coat and a clear top coat on a substrate.

The coating composition for pigmented base coat is a composition made of a coating composition composed of the above-described base resin (a), crosslinking agent (b) and catalyst (c) which is further blended with metal flake powder and/or mica powder as essential component. As the metal flake powder which can be blended, there can be cited, for example, aluminum flake, nickel flake, copper flake and brass flake. As the mica powder, there can be cited, for example, pearl mica and color mica. These powders can be blended in a proportion in the range of usually about 1 to about 30 parts by weight, preferably about 2 to about 20 parts by weight per 10 parts by weight, per 100 parts by weight of the sum of the base resin (a) and the crosslinking agent (b). The coating composition for pigmented base coat may be of an organic solvent type or an aqueous type.

The clear top coat to be formed on the surface of the pigmented base coat can be formed using a coating composition for clear top coat which contains as essential components a base resin having a hydrolytic group directly bonded to a silicon atom and/or a silanol group, a hydroxyl group and an epoxy group (hereafter, abbreviated as "base resin for top coat") and a curing catalyst.

The "hydrolytic group" directly bonded to a silicon atom which the base resin for top coat is a radical which forms a hydroxysilane group when hydrolyzed in the presence of water. Examples thereof include a $C_{1-5}$-alkoxy group; aryloxy groups such as a phenoxy group, a tolyloxy group, a p-methoxyphenoxy groups; a p-nitrophenoxy group and a benzyloxy group; acyloxy group such as an acetoxy group, a propionyloxy group, a butanoyloxy group, a phenylacetoxy group and a formyloxy group; radicals represented by formulae $-N(R_{14})_2$, $-ON=C(R_{14})_2$ or $-NR_{15}COR_{14}$ wherein $R_{14}$'s, which are the same or different, each represent a $C_{1-8}$-alkyl group, an aryl group or an aralkyl group, and $R_{15}$ represents H or $C_{1-8}$-alkyl group.

As the base resin for top coat, the following can be used.

(1) A resin mixture containing three components, i.e., a hydroxy group-containing resin (A), an epoxy group-containing resin (B), and a resin (C) containing a hydrolytic group directly bonded to a silicon atom and/or a silanol group (hereafter, abbreviated as "resin (1)").

(2) A resin mixture containing two components, i.e., the epoxy group-containing resin (B), and the resin (C) containing a hydrolytic group directly bonded to a silicon atom and/or a silanol group, in which one or both of the resins (B) and (C) containing a hydroxyl group (hereafter, abbreviated as "resin (2)").

(3) A resin containing a hydroxyl group, an epoxy group or a hydrolytic group directly bonded to a silicon atom and/or a silanol group, (hereafter, abbreviated as "resin (3)").

Resin (1)

What is suitable for the hydroxyl group-containing resin (A) is a resin which has on average at least two hydroxyl groups per molecule and preferably a number average molecular weight of 1,000 to 200,000, more preferably 3,000 to 80,000. The content of hydroxyl group of less than two on average is undesirable because the curability (gel fraction) of the resulting coating composition is deteriorated. It is preferred the number of the hydroxyl group be no more than 400 in of view of finish quality and water resistance of the resulting coating film. If the number average molecular weight is less than 1,000, the resulting coating film is poor in mechanical properties, finish quality, water resistance and the like. On the other hand, if it exceeds 200,000, the resin has a decreased compatibility with other components, resulting in that the coating composition does not cure uniformly and finish becomes poor.

Any known resins that are commonly used in the field of coating composition can be used as the hydroxyl group-containing resin (A). Particularly, it is preferred to use hydroxyl group-containing vinyl type polymers in view of weatherability, finish quality and the like.

As the hydroxyl group-containing vinyl type polymer, there can be used, for example those (co)polymers which can be obtained by radical-polymerizing a hydroxyl group-containing polymerizable unsaturated monomer (i) and optionally another polymerizable unsaturated monomer (ii).

As the hydroxyl group-containing polymerizable unsaturated monomer (i), there can be cited, for example, the following compounds (i-1) to (i-5).

(i-1) Hydroxyalkyl vinyl ethers: for example, hydroxybutyl vinyl ether, etc.

(i-2) Allyl alcohol and methallyl alcohol.

(i-3) Hydroxyalkyl (meth)acrylates: for example, hydroxyethyl (meth)acrylate, hydroxypropyl (meth)acrylate, hydroxybutyl (meth)acrylate, etc.

(i-4) (Poly)alkylene glycol monoacrylates: for example, ethylene glycol monoacrylate, polyethylene glycol monoacrylate, etc.

(i-5) Adducts of any one of the above-described monomers (i-1) to (i-4) with a lactone (for example, ε-caprolactone or γ-valero-lactone), etc.

As the another polymerizable unsaturated monomer (ii), there can be cited, for example, $C_{1-24}$-alkyl or $C_{3-10}$-cycloalkyl (meth)acrylates such as methyl (meth)acrylate, ethyl (meth)acrylate, butyl (meth)acrylate, hexyl (meth)acrylate, octyl (meth)acrylate, lauryl (meth)acrylate and cyclohexyl (meth)acrylate; vinyl aromatic compounds such as styrene and vinyltoluene; perfluoroalkyl (meth)acrylates such as perfluorobutylethyl (meth)acrylate, perfluoroisononylethyl (meth)acrylate and perfluoroocytlethyl (meth)acrylate; (meth)acrylonitrile; olefins; cyclohexyl or alkyl vinyl ethers; aryl ethers; and the like.

What is suitable for the hydroxyl group-containing resin (B) is a resin which has on average 2 to 300, preferably 2 to 200 epoxy groups per molecule and preferably a number average molecular weight of 120 to 200,000, particularly 240 to 80,000. The content of epoxy group of less than 2 on average is undesirable because the curability, finish quality, impact strength of the resulting coating composition are deteriorated. It is difficult to obtain a compound having a number average molecular weight of less than 120 while the number average molecular weight of exceeding 200,000 is undesirable because the resin has a decreased compatibility with other components, resulting in that the resulting coating film has deteriorated weatherability and finish quality.

The same resins as those described for the alicyclic polyepoxide crosslinking agent can be used as the epoxy group-containing resin (B). Particularly preferred are those resins containing the repeating unit represented (3) described above.

As the resin (C) containing a hydrolytic group directly bonded to a silicon atom and/or a silanol group, there can be used advantageously, for example, silane compounds (iii-1) such as γ-(meth)acryloxypropyl-trimethoxysilane, γ-(meth)acryloxy-propyltriethoxysilane, γ-(meth)acryloxypropyltrisilanol, γ-(meth)acryloxypropylmethyldimethoxysilane, vinyltrimethoxy-silane, 2-styrylethyltrimethoxysilane and allyltriethoxysilane; homopolymers of reaction products (iii-2) between the silane compounds (iii-1) and trialkoxy- or trihydroxysilane compounds (for example, methyltrimethoxysilane, phenyltrimethoxysilane and methyltrisilanol) (for example, polysiloxane type macromonomers described in Japanese Laid-Open Patent 160879/1990), or copolymers of such reaction products with the above-described another polymerizable unsaturated polymer (ii), and the like.

In view of the curability and finish quality of the resulting coating film, blend ratios of the resins (A), (B) and (C) are preferably such that the resin (A) occupies 5 to 95% by weight, preferably 20 to 80% by weight; the resin (B) occupies 95 to 5% by weight, preferably 80 to 20% by weight; and the resin (C) occupies 0.1 to 80% by weight, preferably 1 to 20% by weight, each based on the sum of the three components.

Resin (2):

The epoxy group-containing resin (B) and the resin (C) containing a hydrolytic group directly bonded to a silicon atom and/or a silanol group, used in the resin (2) are the same as those described above except that in the resin (2) one or both of the resin (B) and the resin (C) have a hydroxyl group. Hydroxyl groups can be introduced in the resin (B) and (C), for example, by using the above-described hydroxyl group-containing polymerizable unsaturated monomer (i) as essential monomer component. In this case, it is preferred that the number of hydroxyl group contained in the resin is on average at least one, particularly 400 or less, more particularly 2 to 300, per molecule. It desirable that the resin to which hydroxyl groups are introduced have a number average molecular weight of 1,000 to 200,000, preferably 3,000 to 80,000.

In view of the curability of the coating composition and the finish quality of the resulting coating film, blend ratios of the resins (B) and (C) are preferably such that the resin (B) occupies 5 to 95% by weight, preferably 20 to 80% by weight; and the resin (C) occupies 95 to 5% by weight, preferably 80 to 20% by weight, each based on the sum of the two components.

If desired, the above-described hydroxyl group-containing containing resin (A) can further be added to the resin (2).

Resin (3)

It is desirable that the resin (3) have on average at least one, preferably on average 2 to 40, per molecule, of hydrolytic groups directly bonded to a silicon atom and/or a silanol group, silicon atom, on average at least one, preferably 2 to 40, per molecule, of epoxy groups and on average 2 to 200, preferably 2 to 150, per molecule, of hydroxyl groups in view of the curability of the coating composition and the finish quality of the resulting coating film.

As the resin (3), there can be used advantageously copolymers obtained from the above-described hydroxyl group-containing polymerizable unsaturated monomer (i), an oxirane group-containing polymerizable unsaturated monomer (iv), for example, polymerizable epoxy monomers represented by formula (4) to (15) above, the above-described silane compound (iii-1) and/or reaction product (iii-2), and optionally another polymerizable unsaturated monomer (ii).

The monomers (i) to (iv) above may be blended in any blend ratios so far as the contents of the functional groups in the resulting resin are in the above-described ranges.

It is desirable that the number average molecular weight of the resin (3) be in the range of generally 1,000 to 200,000, preferably 3,000 to 80,000.

If desired, the above-described hydroxyl group-containing resin (A) can further be added to the resin (3).

Among the resins (1) to (3), it is desirable to use the resin (3) because it gives excellent effects on curability of the coating composition and the finish quality of the resulting coating film.

The above-described base resin can be used in the form of a solution type, dispersion type, or non-aqueous dispersion type formulations dissolved or dispersed in a hydrocarbon type solvent such as toluene or xylene; a ketone type solvent such as methyl ethyl ketone or methyl isobutyl ketone; an ester type solvent such as ethyl acetate or butyl acetate; and ether type solvent such as dioxane or ethylene glycol diethyl ether; an alcohol type solvent such as butanol or propanol; an aliphatic hydrocarbon such as pentane, hexane or heptane; or the like.

The non-aqueous dispersion type base resin composition can be prepared by adding at least one radical polymerizable unsaturated monomer and a polymerization initiator in the presence of a dispersion stabilizer selected from the above-described resins (1) to (3) to an organic solvent which dissolves the monomer and the dispersion stabilizer but does not dissolve polymer particles obtained from the monomer and allowing polymerization reaction to proceed to form a non-aqueous dispersion. When the resin used as the dispersion stabilizer is a mixture, i.e., a mixture of the resin (1) and (2), the non-aqueous dispersion can be obtained by carrying out the polymerization of monomer(s) using a part of or all the components as the dispersion stabilizer and blending the product with remaining component, if any (when a part of components in the resin mixture is used as the dispersion stabilizer). All the above-described monomers can be used as monomers for preparing polymers which constitute particle component in the non-aqueous dispersion. It is preferred that the polymer constituting the particle component be a copolymer which contains a large amount of highly polar monomers because the polymer must not dissolve in organic solvents. That is, the polymer preferably contains a large amount of monomers such as methyl (meth)acrylate, ethyl (meth)acrylate, (meth)acrylonitrile, 2-hydroxy(meth)acrylate, hydroxypropyl (meth)acrylate, (meth)acrylamide, acrylic acid, methacrylic acid, itaconic acid, styrene, vinyltoluene, α-methylstyrene and N-methylol(meth)acrylamide. If desired, the particles contained in the non-aqueous dispersion may be crosslinked. Crosslinking inside the particles can be carried out by copolymerizing a polyfunctional monomer such as divinylbenzene or ethylene glycol dimethacrylate therewith.

The organic solvent used in the non-aqueous dispersion includes a solvent which does not dissolve dispersed polymer particles formed by the polymerization but is a good solvent for the dispersion stabilizer and the radical polymerizable unsaturated monomer. Generally, a mixture of an aliphatic hydrocarbon as a main component and any desired one of an aromatic hydrocarbon, the above-described alcohol type, ether type, ester type or ketone type solvent can be used advantageously. If desired, trichlorotrifluoroethane, m-xylylene hexafluoride, tetrachlorohexafluorobutane, etc. can also be used.

Polymerization of the monomers can be carried out using a radical polymerization initiator. Examples of the radical polymerization initiator which can be used include azo type initiators such as 2,2'-azoisobutyronitrile and 2,2'-azobis(2,4-dimethylvaleronitrile); and peroxide type initiators such as benzoyl peroxide, lauryl peroxide and tert-butyl peroctanoate. These polymerization initiators can be used in an amount in the range of generally 0.2 to 10 parts by weight per 100 parts by weight of the monomer(s) to be polymerized. Proportion of the dispersion stabilizer resin present at the time of polymerization may be selected from a wide range depending on the type of the resin to be used, and generally it is suitable to use about 3 to 240 parts by weight, preferably 5 to 82 parts by weight, per 100 parts by weight of the resin.

In the present invention, the dispersion stabilizer resin may be bonded to the polymer particles.

The resin composition in the form of non-aqueous dispersion is a non-aqueous dispersion comprises a liquid phase composed of an organic solvent having dissolved therein a dispersion stabilizer resin and a solid phase composed of polymer particles prepared by polymerization of a radical polymerizable unsaturated monomer, and therefore it is possible to increase its solid content upon coating to a great extent and it can form coating films having excellent finish appearance without forming sag or run because its viscosity increases after coating. The resulting coating film is a film which has an organic silane group in the continuous phase thereof and is stable to light and chemicals. The polymer particle component in the coating film is stabilized by the continuous phase and the coating film is reinforced by the particle component, resulting in that films having excellent mechanical characteristics such as impact strength can be formed.

The curing catalyst used in the coating composition for clear top coat is used in order to accelerate reactions of silane groups, epoxy groups and hydroxyl groups in the resin. Suitable examples of the curing catalyst include metal alkoxides composed of a metal such as aluminum, titanium, zirconium, calcium or barium and an alkoxy group bonded thereto; metal chelate compounds composed of the metal alkoxide and a chelate compound which form keto-enol tautomers coordinated to the alkoxide; Lewis acids such as AlCl₃, Al(C₂H₅)₂Cl, TiCl₄, ZrCl₄, SnCl₄, FeCl₄, BF₃, BF₃(OC₂H₅)₂; organic protic acids (e.g., methanesulfonic acid, benzenesulfonic acid, p-toluenesulfonic acid, etc.), inorganic protic acids (e.g. phosphoric acid, phosphorous acid, phosphoric acid, sulfuric acid, etc.); compound having a

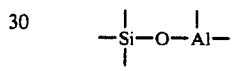

bond such as aluminum silicate; and the like.

Among the above compounds, the metal chelate compounds are preferred. Particularly, suitable examples of the metal chelate compounds include aluminum chelate compounds such as diisopropoxyethylacetoacetatoaluminum, tris(ethylacetoacetato)aluminum, isopropoxybis(ethylacetoacetato)aluminum, monoacetylacetonatobis(ethylacetoacetato)aluminum, tris(n-propylaceto-acetato)alminum, tris(n-butylacetoacetato)aluminum, monoethylacetoacetatobis(acetylacetonato)aluminum, tris-(acetylacetonato)-aluminum and tris(propyionylacetonato)aluminum and acetyl-acetonatobis(-propionylacetonato)aluminum; titanium chelate compounds such as diisopropoxybis(ethylacetoacetato)titanium and diisopropoxybis(acetylacetonato)titanium; zirconium chelate compounds such as tetrakis(n-propylacetoacetato)zirconium, tetrakis-(acetylacetonato)zirconium and tetrakis(ethylacetoacetato)zirconium; and the like.

Blend ratio of the curing catalyst may be 0.01 to 30 by weight, preferably 0.1 to 10 parts by weight, per 100 parts by weight of the resin. If the curing catalyst is in an amount of less than 0.01 part by weight, the curability of the coating composition and the finish quality of the resulting coating film are deteriorated while the amount of the curing catalyst exceeding 30 parts by weight decreases the finish quality and water resistance of the resulting coating film. Therefore, blend ratios outside the above range are undesirable.

The coating composition for clear top coat may contain various additives for coating composition such as ultraviolet absorbents, antioxidants and light stabilizers, if desired.

The process of forming pigmented coating films according to the invention can be carried out by coating an electrodeposition coating composition on a chemically formed steel plate, applying a coating composition for intercoat thereon (sometimes this may be omitted) to form a coating film, applying thereon a primer suitable for the intercoat and various plastics materials, applying a pigmented base coating composition on the coating film having an intercoat as a material, and then applying a coating composition for clear top coat on the material. The electrodeposition coating composition and coating composition for intercoat are baked at suitable temperatures which may vary depending on the type of the coating composition, usually at 140 to 190° C for 30 to 90 minutes. Coating of the coating compositions for pigmented base and clear top coat can be carried out by usual coating methods, for example, using an electrostatic or non-electrostatic coating machine. The thickness of the pigmented base coat is preferably 10 to 50μm (after curing). After coating the coating composition, the coated material is cured by leaving it at room temperature for several minutes, forcibly drying it at about 50° to 80° C. for several minutes, or heating it (heating at 100° C. for 60 minutes to at 180° C. for 10 minutes may be sufficient), and then a coating composition of clear top coat is coated thereon. The thickness of the clear top coat is preferably 20 to 100 m (after curing). Then, the coated material may be cured by heating it at about 60° to about 170° C. for about 10 to about 90 minutes.

Alternatively, after coating a pigmented base coat and while it is still in a uncured state, a coating composition for clear top coat may be coated on the surface of the pigmented base coat, followed by baking the coated material at about 100° to about 180° C. for about 10 to about 90 minutes.

Methods of applying the coating compositions for pigmented base coat and for clear top coat are not limited particularly and conventional methods may be used as they are. For example, air spray, static air spray, airless spray, bell static coating, minibell static coating may be used advantageously.

Next, the present invention will be explained more concretely by examples. However, it should not be construed that the present invention is limited thereto. All "parts" and "percentages (%)" in the following examples and comparative examples are by weight.

EXAMPLE 1

Methylpropanol (89 parts) was charged in a four-necked flask and heated at 110° C. A mixture of 20 parts of hydroxyethyl acrylate, 60 parts of methyl methacrylate and 20 parts of styrene and also a mixture o of 1 part of 2,2'-azobisisobutyronitrile and 10 parts of methyl isobutyl ketone were dropwise added thereto in 1 hour. After aging the resulting mixture for 1.5 hours, a resin was obtained which had a hydroxyl value of 97, a number average molecular weight of about 20,000 and a solid content of 50%. To this were added 31.3 parts of a 80% EHPE-3150 solution obtained by dissolving 25 parts of EHPE-3150 (epoxidated polyvinylcyclohexene oxide, epoxy equivalent: 190, average molecular weight: 1,500; trade name for a product by DAICEL CHEMICAL INDUSTRY CO., LTD.) in 6.3 parts of methylpropanol, and then 19.5 parts of a 20% methanol solution of tetraethylammonium hydroxide. The resulting mixture was stirred and diluted with xylol to obtain a coating composition having a a solid content of 30%.

EXAMPLE 2

Procedures of Example 1 were repeated except that the monomer components used in Example 1 were replaced by those described below:

| hydroxyethyl methacrylate | 25 parts |
|---|---|
| 2-ethylhexyl methacrylate | 10 parts |
| methyl methacrylate | 55 parts |
| styrene | 10 parts | to prepare an acrylic resin, which was aged to obtain 200 parts of resin having a hydroxyl value of 108, a number average molecular weight of 25,000, and a solid content of 50%. To this were added 18.8 parts of 80% EHPE-3150 solution (15 parts in terms of solid content), and then 16.2 parts of a 10% methanol solution of tetramethylammonium hydroxide. The resulting mixture was stirred and diluted with xylol to obtain a coating composition having a solid content of 30%.

EXAMPLE 3

A mixture of 200 parts of the 50% resin obtained in Example 1, 15 parts of 3,4-epoxycyclohexylcarboxymethylcyclohexene oxide and 17.9 parts of a 10 % methanol solution of tetrabutylammonium hydroxide was stirred and then diluted with xylol to obtain a coating composition having a solid content of 30%.

EXAMPLE 4

Methylpropanol (89 Parts) was charged in a four-necked flask and heated at 110° C. A mixture of 15 parts of hydroxyethyl acrylate, 70 parts of methyl methacrylate and 15 parts of styrene and also a mixture of 1 part of azoisobutyronitrile and 10 parts of methyl isobutyl ketone were dropwise added thereto in 1 hour. After aging the resulting mixture for 1.5 hours, a base resin was obtained which had a hydroxyl value of 73, a number average molecular weight of 25,000 and a solid content of 50%. On the other hand, 14.5 parts of DURANATE TPA-100 (isocyanurated product of hexamethylene diisocyanate, trifunctional isocyanate, isocyanate equivalent: 185; trade name for a product by ASAHI CHEMICAL INDUSTRY CO., LTD.) and 10.5 parts of 3,4-epoxytetrahydrobenzyl alcohol (produced by DAICEL INDUSTRY CO., LTD., epoxy equivalent: 135) were reacted at 120° C. for 3 hours, and after confirming that isocyanate value was 0, 6.3 parts of methylpropanol was added to the reaction mixture to obtain an epoxy compound having a solid content of 80% and an epoxy equivalent of 325. The base resin (200 parts), 31.3 parts of the epoxy compound and 19 parts of a 20% methanol solution of tetraethylammonium hydroxide were mixed and well stirred, and then the resulting mixture was diluted with xylol to obtain a coating composition having a solid content of 30%.

EXAMPLE 5

Procedures of Example 4 were repeated except that the monomer components used in Example 4 were replaced by those described below:

| hydroxyethyl methacrylate | 30 parts |
|---|---|
| 2-ethylhexyl methacrylate | 10 parts |
| methyl methacrylate | 45 parts |
| styrene | 15 parts | to prepare an acrylic resin, which was aged to obtain 200 parts of a resin having a hydroxyl value of 129, a number average molecular weight of 20,000, and a solid content of 50%. On the other hand, 17.5 parts of IPDI-T1890 (isocyanurated product of isophorone diisocyanate, isocyante equivalent: 247; trade name for a product by DAICEL HUELLS CO., LTD.) and 12.5 parts of CELLOXIDE 4000 (trade name for a product by DAICEL INDUSTRY CO., LTD., epoxy equivalent: 177) were at 120° C. for 3 hours, and after confirming that isocyanate value was 0, 7.5 parts of methylpropanol was added to the reaction mixture to obtain an epoxy compound having a solid content of 80 % and an epoxy equivalent of 425. The base resin (200 parts), 37.5 parts of the epoxy compound and 16 parts of a 10% methanol solution of tetraethylammonium hydroxide were mixed and well stirred, and then the resulting mixture was diluted with xylol to obtain a coating composition having a solid content of 30%.

TOATSU CO., LTD.) and 231 parts of xylol to obtain a coating composition having a solid content of 30%.

PREPARATION OF COATING FILMS:

Each of the coating compositions obtained in Examples 1 to 6 and Comparative Example 1 was spray coated on a zinc phosphate-treated steel plate separately in a dry film thickness of about 20 μm, and baked under baking conditions described in Table 1 to obtain coating films. The coating film samples thus obtained were subjected to tests on coating film smoothness, brine spray resistance, pencil hardness and flexing resistance. Coating films for the measurement of gel fraction were obtained in the same manner as above except that glass plates were used instead of the steel plates.

TABLE 1

|  | EX. 1 | Ex. 2 | Ex. 3 | Ex. 4 | Ex. 5 | Ex. 6 | Compar. Ex. 1 |
|---|---|---|---|---|---|---|---|
| Storage Stability of Coating Composition (*1) | Good | Good | Good | Good | Good | Good | Good |
| Baking Conditions | 140° C. 20 min. | 140° C. 20 min. | 140° C. 20 min. | 140° C. 20 min. | 140° C. 20 min. | 140° C. 20 min. | 140° C. 20 min. |
| Performance of Coating Film |  |  |  |  |  |  |  |
| Coating Film Smoothness (*2) | Good | Good | Good | Good | Good | Good | Good |
| Salt Spray Resistance (*3) | Acceptable | Acceptable | Acceptable | Acceptable | Acceptable | Acceptable | Unacceptable |
| Pencil Hardness (*4) | 3H | 3H | 2H | 3H | H | 2H | 4B |
| Flexing Resistance (*5) | Acceptable | Acceptable | Acceptable | Acceptable | Acceptable | Acceptable | Unacceptable |
| Gel Fraction (*6) | 99 | 96 | 90 | 96 | 89 | 91 | 50 |

Notes for Table 1:

(*1): Storage stability; After leaving at 30° C. for 1 month, sedimentation and separation of the coating composition were observed visually. In addition, the coating composition after the storage was coated and dried and examined for initial appearance of the resulting coating film and decrease in the performances (salt spray resistance, flexing resistance, pencil hardness, etc.) of the coating film.

(*2): Coating film smoothness; Depressions and protrusions on the surface of the resulting coating film were observed visually.

(*3): Salt spary resistance; Tests were carried out according to JIS Z-2371. Samples which showed a creep width of 2 mm for one side from cut portion in the coating film were judged to be acceptable.

(*4): Pencil hardness: Tests were carried out according to JIS F-5400.

(*5): Flexing resistance; Test plates were folded at right angles in an atmosphere at 20° C. in 2 to 3 seconds. Samples which showed no peeling-off nor cracking of the coating film at the folded portion were judged to be acceptable.

(*6): Gel fraction; Dry coating film was peeled off from the glass plate and introduced in a 300 mesh stainless steel net vessel, followed by extraction for 4 hours with a 1:1 acetone/methanol solvent in a Soxhlet extractor at reflux temperature. Gel fraction was calculated according to the following formula:

$$\text{Gel fraction} = \frac{\text{Weight of coating film after extraction}}{\text{Weight of coating film before extraction}} \times 100$$

The test (*1) to (*6) were the same in the following examples and comparative examples.

EXAMPLE 6

Adduct (26.5 parts) of 1 mole of 3,4-epoxytetrahydrobenzyl alcohol with 2 mole of ε-caprolactone (produced by DAICEL CHEMICAL INDUSTRY CO., LTD., epoxy equivalent: 360) and 13.5 parts of DURANATE TPA-100 (isocyanurated product of hexamethylene diisocyanate, trade name for a product by ASAHI CHEMICAL INDUSTRY CO., LTD. isocyanate equivalent: 185) were reacted at 120° C. for 3 hours. After confirming that isocyanate value was 0, 10 parts of methylpropanol was added to the reaction mixture to obtain an epoxy compound having a solid content of 80% and an epoxy equivalent of 545. The epoxy compound thus obtained (50 parts), 200 parts of the 50% base resin obtained in Example 4 and 18 parts of a 20% methanol solution of tetrabutylammonium hydroxide were mixed and well stirred, and then the resulting mixture was diluted with xylol to obtain a coating composition having a solid content of 30%.

COMPARATIVE EXAMPLE 1

The 50% base resin (200 parts) obtained in Example 1 was blended with 42 parts of SYMEL 303 (trade name for an aminoaldehyde resin produced by MITSUI

EXAMPLE 7

Methylpropanol (89 parts) was charged in a four-necked flask and heated at 110° C. A mixture of 3 parts of acrylic acid, 20 parts of hydroxyethyl acrylate, 57 parts of methyl methacrylate and 20 parts of styrene and also a mixture of 1 part of 2,2'-azobisisobutyronitrile and 10 parts of methyl isobutyl ketone were dropwise added thereto in 1 hour. After aging the resulting mixture for 1.5 hours, a resin was obtained which had an acid value of 23, a hydroxyl value of 97, a number average molecular weight of about 20,000 and a solid content of 50%. To this were added 31.3 parts of a 80% EHPE-3150 solution obtained by dissolving 25 parts of EHPE-3150 (epoxidated polyvinyl-cyclohexene oxide, epoxy equivalent: 190, average molecular weight: 1,500; trade name for a product by DAICEL CHEMICAL INDUSTRY CO., LTD.) in 6.3 parts of methylpropanol, and then 19.5 parts of a 20% methanol solution of tetraethylammonium hydroxide. The resulting mixture was stirred and diluted with xylol to obtain a coating composition having a solid content of 30%.

EXAMPLE 8

Procedures of Example 7 were repeated except that the monomer components used in Example 7 were replaced by those described below:

| | | | |
|---|---|---|---|
| methacrylic acid | 4 parts | methacrylic acid | 3 parts |
| hydroxyethyl methacrylate | 25 parts | hydroxyethyl methacrylate | 30 parts |
| 2-ethylhexyl methacrylate | 10 parts | 2-ethylhexyl methacrylate | 10 parts |
| methyl methacrylate | 51 parts | methyl methacrylate | 42 parts |
| styrene | 10 parts | styrene | 15 parts | to prepare an acrylic resin, which was aged to obtain 200 parts of a resin having an acid value of 26, a hydroxyl value of 108, a number average molecular weight of 25,000, and a solid content of 50%. To this were added 18.8 parts of 80% EHPE-3150 solution (15 parts in terms of solid content), and then 16.2 parts of a 10% methanol solution of tetramethylammonium hydroxide. The resulting mixture was stirred and diluted with xylol to obtain a coating composition having a solid content of 30%.

EXAMPLE 9

A mixture of 200 parts of the 50% resin obtained in Example 7, 15 parts of 3,4-epoxycyclohexylcarboxymethylcyclohexene oxide and 17.9 parts of a 10% methanol solution of tetrabutylammonium hydroxide was stirred and then diluted with xylol to obtain a coating composition having a solid content of 30%.

EXAMPLE 10

Methylpropanol (89 parts) was charged in a four-necked flask and heated at 110° C. A mixture of 2.7 parts of acrylic acid, 15 parts of hydroxyethyl acrylate, 67.3 parts of methyl methacrylate and 15 parts of styrene and also a mixture of 1 part of azoisobutyronitrile and 10 parts of methyl isobutyl ketone were dropwise added thereto in 1 hour. After aging the resulting mixture for 1.5 hours, a base resin was obtained which had an acid value of 21, a hydroxyl value of 73, a number average molecular weight of 25,000 and a solid content of 50%. On the other hand, 14.5 parts of DURANATE TPA-100 (isocyanurated product of hexamethylene diisocyanate, trifunctional isocyanate, isocyanate equivalent: 185; trade name for a product by ASAHI CHEMICAL INDUSTRY CO., LTD.) and 10.5 parts of 3,4-epoxytetra-hydrobenzyl alcohol (produced by DAICEL INDUSTRY CO., LTD., epoxy equivalent: 135) were reacted at 120° C. for 3 hours, and after confirming that isocyanate value was 0, 6.3 parts of methylpropanol was added to the reaction mixture to obtain an epoxy compound having a solid content of 80% and an epoxy equivalent of 325. The base resin (200 parts), 31.3 parts of the epoxy compound and 19 parts of a 20% methanol solution of tetraethylammonium hydroxide were mixed and well stirred, and then the resulting mixture was diluted with xylol to obtain a coating composition having a solid content of 30%.

EXAMPLE 11

Procedures of Example 10 were repeated except that the monomer components used in Example 10 were replaced by those described below:

to prepare an acrylic resin, which was aged to obtain 200 parts of a resin having an acid value of 20, a hydroxyl value of 129, a number average molecular weight of 20,000, and a solid content of 50%. On the other hand, 17.5 parts of IPDI-T1890 (isocyanurated product of isophorone diisocyanate, isocyanate equivalent: 247; trade name for a product by DAICEL HUELLS CO., LTD.) and 12.5 parts of CELLOXIDE 4000 (trade name for a product by DAICEL INDUSTRY CO., LTD., epoxy equivalent: 177) were reacted at 120° C. for 3 hours, and after confirming that isocyanate value was 0, 7.5 parts of methylpropanol was added to the reaction mixture to obtain an epoxy compound having a solid content of 80% and an epoxy equivalent of 425. The base resin (200 parts), 37.5 parts of the epoxy compound and 16 parts of a 10% methanol solution of tetraethylammonium hydroxide were mixed and well stirred, and then the resulting mixture was diluted with xylol to obtain a coating composition having a solid content of 30%.

EXAMPLE 12

Adduct (26.5 parts) of 1 mole of 3,4-epoxytetrahydrobenzyl alcohol with 2 mole of ε-caprolactone (produced by DAICEL CHEMICAL INDUSTRY CO., LTD., epoxy equivalent: 360) and 13.5 parts of DURANATE TPA-100 (the same as described above) were reacted at 120° C. for 3 hours. After confirming that isocyanate value was 0, 10 parts of methylpropanol was added to the reaction mixture to obtain an epoxy compound having a solid content of 80 and an epoxy equivalent of 545. The epoxy compound thus obtained (50 parts), 200 parts of the 50% base resin obtained in Example 7 and 18 parts of a 20% methanol solution of tetrabutylammonium hydroxide were mixed and well stirred, and then the resulting mixture was diluted with xylol to obtain a coating composition having a solid content of 30%.

COMPARATIVE EXAMPLE 2

The 50% base resin (200 parts) obtained in Example 7 was blended with 42 parts of SYMEL 303 (trade name for an aminoaldehyde resin produced by MITSUI TOATSU CO., LTD.) and 231 parts of xylol to obtain a coating composition having a solid content of 30%.

Preparation of coating films:

Coating films were prepared and tested in the same manner as described above. Results obtained are shown in Table 2.

TABLE 2

| | EX. 7 | Ex. 8 | Ex. 9 | Ex. 10 | Ex. 11 | Ex. 12 | Compar. Ex. 2 |
|---|---|---|---|---|---|---|---|
| Storage Stability of Coating Composition (*1) | Good | Good | Good | Good | Good | Good | Good |
| Baking Conditions | 140° C. 20 min. | 140° C. 20 min. | 140° C. 20 min. | 140° C. 20 min. | 140° C. 20 min. | 140° C. 20 min. | 140° C. 20 min. |
| Performance of Coating Film | | | | | | | |

TABLE 2-continued

|  | EX. 7 | Ex. 8 | Ex. 9 | Ex. 10 | Ex. 11 | Ex. 12 | Compar. Ex. 2 |
|---|---|---|---|---|---|---|---|
| Coating Film Smoothness (*2) | Good | Good | Good | Good | Good | Good | Good |
| Salt Spray Resistance (*3) | Acceptable | Acceptable | Acceptable | Acceptable | Acceptable | Acceptable | Unacceptable |
| Pencil Hardness (*4) | 3H | 3H | 2H | 3H | 2H | 2H | 4B |
| Flexing Resistance (*5) | Acceptable | Acceptable | Acceptable | Acceptable | Acceptable | Acceptable | Unacceptable |
| Gel Fraction (*6) | 99 | 97 | 90 | 95 | 91 | 92 | 70 |

EXAMPLE 13

Methylpropanol (89 parts) was charged in a four-necked flask and heated at 110° C. A mixture of 3 parts of acrylic acid, 20 parts of hydroxyethyl acrylate, 57 parts of methyl methacrylate and 20 parts of styrene and also a mixture of 1 part of 2,2'-azobisisobutyronitrile and 10 parts of methyl isobutyl ketone were dropwise added thereto in 1 hour. After aging the resulting mixture for 1.5 hours, a resin was obtained which had an acid value of 23, a hydroxyl value of 97, a number average molecular weight of about 20,000 and a solid content of 50%. To this were added 31.3 parts of a 80% EHPE-3150 solution obtained by diisolving 25 parts of EHPE-3150 (epoxidated polyvinyl-cyclohexene oxide, epoxy equivalent: 190, average molecular weight: 1,500; trade name for a product by DAICEL CHEMICAL INDUSTRY CO., LTD.) in 6.3 parts of methylpropanol, and then 19.5 parts of a 20% aqueous solution of tetraethylammonium hydroxide. While stirring, 166 parts of deionized water was added to the resulting mixture to obtain an aqueous dispersion having a solid content of 30% and an average particle diameter of 0.1 μm.

EXAMPLE 14

Procedures of Example 13 were repeated that the monomer components used in Example 13 were replaced by those described below:

| methacrylic acid | 4 parts |
| hydroxyethyl methacrylate | 25 parts |
| 2-ethylhexyl methacrylate | 10 parts |
| methyl methacrylate | 51 parts |
| styrene | 10 parts | to prepare an acrylic resin, which was aged to obtain 200 parts of a resin having an acid value of 26, a hydroxyl value of 108, a number average molecular weight of 25,000, and a solid content of 50%. To this were added 18.8 parts of 80% EHPE-3150 solution (15 parts in terms of solid content), and then 16.2 parts of a 10% aqueous solution of tetramethylammonium hydroxide. While stirring, 148 parts of deionized water was added to the resulting mixture to obtain an aqueous dispersion having a solid content of 30% and an average particle diameter of 0.15 m.

EXAMPLE 15

While stirring, deionized water (148 parts) was added to a mixture of 200 parts of the 50% resin obtained in Example 13, 15 parts of 3,4-epoxycyclohexylcarboxymethylcyclohexene oxide, 17.9 parts of a 10% aqueous solution of tetrabutylammonium hydroxide and 2 parts of triethylamine to obtain an aqueous dispersion having a solid content of 30% and an average particle diameter of 0.09 μm.

EXAMPLE 16

Methylpropanol (89 parts) was charge in a four-necked flask and heated at 110° C. A mixture of 2.7 parts of acrylic acid, 15 parts of hydroxyethyl acrylate, 67.3 parts of methyl methacrylate and 15 parts of styrene and also a mixture of 1 part of azoisobutyronitrile and 10 parts of methyl isobutyl ketone were dropwise added thereto in 1 hour. After aging the resulting mixture for 1.5 hours, a base resin was obtained which had an acid value of 21, a hydroxyl value of 73, a number average molecular weight of 25,000 and a solid content to 50%. On the other hand, 14.5 parts of DURANATE TPA-100 (isocyanurated product of hexamethylene diisocyanate, trifunctional isocyanate, isocyanate equivalent: 185' trade name for a product by ASAHI CHEMICAL INDUSTRY CO., LTD.) and 10.5 parts of 3,4-epoxytetra-hydrobenzyl alcohol (produced by DAICEL INDUSTRY CO., LTD., epoxy equivalent: 135) were reacted at 120° C. for 3 hours, and after confirming that isocyanate value was 0, 6.3 parts of methylpropanol was added to the reaction mixture to obtain an epoxy compound having a solid content of 80% and an epoxy equivalent of 325. While well stirring a mixture of the base resin (200 parts), 31.3 parts of the epoxy compound and 19 parts of a 20% aqueous solution of tetraethylammonium hydroxide, 166 parts of deionized water was added to the mixture to obtain an aqueous dispersion having a solid content of 30% and an average particle diameter of 0.09 μm.

EXAMPLE 17

Procedures of Example 16 were repeated except that the monomer components used in Example 16 were replaced by those described below:

| methacrylic acid | 3 parts |
| hydroxyethyl methacrylate | 30 parts |
| 2-ethylhexyl methacrylate | 10 parts |
| methyl methacrylate | 42 parts |
| styrene | 15 parts | to prepare an acrylic resin, which was aged to obtain 200 parts of a resin having an acid value of 20, a hydroxyl value of 129, a number average molecular weight of 20,000, and a solid content of 50%. On the other hand, 17.5 parts of IPDI-T1980 (isocyanurated product of isophorone diisocyanate, isocyanate equivalent: 247; trade name for a product by DAICEL HUELLS CO., LTD.) and 12.5 parts of CELLOXIDE 4000 (trade name for a product by DAICEL INDUSTRY CO., LTD., epoxy equivalent: 177) were reacted at 120° C. for 3 hours, and after confirming that isocyanate value was 0, 7.5 parts of methylpropanol was added to the reaction mixture to obtain an epoxy compound having a solid content of 80% and an epoxy equivalent of 425. While stirring, 142 parts of deionized water was added to a mixture of the base rein (200 parts), 37.5 parts of the epoxy compound and 16 parts of a 10% aqueous solution of tetramethylammonium hydroxide, to obtain an aqueous dispersion having a solid content of 30% and an average particle diameter of 0.16 m.

EXAMPLE 18

Adduct (26.5 parts) of 1 mole of 3,4-epoxytetrahydrobenzyl alcohol with 2 mole of ε-caprolactone (produced by DAICEL CHEMICAL INDUSTRY CO., LTD., epoxy equivalent: 360) and 13.5 parts of DURANATE TPA-100 (the same as described above) were reacted at 120° C. for 3 hours. After confirming that isocyanate value was 0, 10 parts of methylpropanol was added to the reaction mixture to obtain an epoxy compound having a solid content of 80% and an epoxy equivalent of 545. The epoxy compound thus obtained (50 parts), 200 parts of the 50% base resin obtained in Example 16 and 18 parts of a 20% aqueous solution of tetrabutylammonium hydroxide were mixed. While well stirring, 197 parts of deionized water was added to the resulting mixture to obtain an aqueous dispersion having a solid content of 30% and an average particle diameter of 0.18 μm.

COMPARATIVE EXAMPLE 3

Procedure of Example 13 were repeated except that 20 parts of hydroxyethyl acrylate and 57 parts of methyl methacrylate used in Example 13 were replaced by 77 parts of methyl methacrylate, 19.5 parts of the 20% aqueous solution of tetraethylammonium hydroxide in Example 13 was replaced by 3.4 parts of trimethylamine, and the quantity of deionized water (166 parts) in Example 13 was changed to 172 parts to obtain an aqueous dispersion having a solid content of 30%.

Preparation of coating films:

Coating films were prepared and tested in the same manner as described above. Results obtained are shown in Table 3.

hour in a nitrogen atmosphere. After completion of the addition, the resulting mixture was aged for 1.5 hours, and a mixture of 0.5 part of 2,2'-azobis(2,4-dimethylvaleronitrile and 2 parts of isopropyl alcohol was dropwise added thereto in 1 hour. The mixture thus obtained was further aged for a continuous 1 hour to obtain a base resin having an acid value of 40, a hydroxyl value of 121, a number average molecular weight of about 30,000. To this were added 30 parts of 3,4-epoxycyclohexylcarboxymethylcyclohexene oxide and 20 parts of a toluene solution having dissolved therein 2 parts of aluminum acetylacetonate to obtain a composition of Example 19. The composition thus obtained was coated on a zinc phosphate-treated steel plate in a thickness of about 30 μm and heated at 140° C. for 20 minutes to obtain a coating film having a gel fraction (*6) of 96%, a coating surface smoothness (*2) being good, and a flexing resistance (*5) being acceptable. The storage stability (*1) of the composition was good.

EXAMPLE 20

30% Ammonia water (8.1 parts) was added to the composition obtained in Example 19. While stirring, deionized water was added thereto to obtain an aqueous dispersion of Example 20, having a resin content of 30% and an average particle diameter of 0.12 μm. The composition thus obtained was spray coated on a zinc phosphate-treated steel plate and heated at 80° C. for 10 minutes and then baked at 150° C. for 20 minutes to obtain a coating film having a thickness of 25 μm, a pencil hardness (*4) of H, a gel fraction (*6) of 93%, a coating surface smoothness (*2) being good, and a flexing resistance (*5) being acceptable. The storage stability (*1) of the composition was good.

EXAMPLE 21

An acrylic resin having a monomer composition of 7 parts of methacrylic acid, 20 parts of hydroxyethyl methacrylate, 20 parts of adduct of hydroxyethyl methacrylate with 5 mole of caprolactone, 7 parts of 2 ethylhexyl methacrylate and 46 parts of methyl methacrylate was prepared under the same conditions as in Example 19, and a curing agent and a catalyst were blended

TABLE 3

|  | EX. 13 | Ex. 14 | Ex. 15 | Ex. 16 | Ex. 17 | Ex. 18 | Compar. Ex. 3 |
| --- | --- | --- | --- | --- | --- | --- | --- |
| Storage Stability of Coating Composition (*1) | Good | Good | Good | Good | Good | Good | Good |
| Baking Conditions | 140° C. 20 min. | 140° C. 20 min. | 140° C. 20 min. | 140° C. 20 min. | 140° C. 20 min. | 140° C. 20 min. | 140° C. 20 min. |
| Performance of Coating Film |  |  |  |  |  |  |  |
| Coating Film Smoothness (*2) | Good | Good | Good | Good | Good | Good | Good |
| Salt Spray Resistance (*3) | Acceptable | Acceptable | Acceptable | Acceptable | Acceptable | Acceptable | Unacceptable |
| Pencil Hardness (*4) | 3H | 3H | 2H | 3H | 2H | 2H | 4B |
| Flexing Resistance (*5) | Acceptable | Acceptable | Acceptable | Acceptable | Acceptable | Acceptable | Unacceptable |
| Gel Fraction (*6) | 99 | 98 | 94 | 95 | 92 | 93 | 68 |

EXAMPLE 19

Isopropyl alcohol (45 parts) was charged in a four-necked flask and heated at 80° C. To this were simultaneously added dropwise a mixture of 5 parts of acrylic acid, 25 parts of hydroxyethyl acrylate, 10 parts of ethyl acrylate, 30 parts of butyl acrylate and 30 parts of styrene and also a mixture of 1 part of 2,2'-azobis(2,4-dimethylvaleronitrile) and 3 parts of isopropyl alcohol in 3 therewith. The resulting mixture was neutralized and dispersed in water in the same manner as in Example 20 to obtain an aqueous dispersion of Example 21, having a solid content of 20% and an average particle diameter of 0.15 m. The composition thus obtained was electrodeposited on anodized aluminum plate and bakded at 160° C. for 20 minutes to obtain a coating film having a thickness of 10 μm, a pencil hardness (*4) of 2H, a gel fraction (*6) of 92%, a coating surface smoothness (*2) being good, and a flexing resistance (*5) being acceptable. The storage stability (*1) of the composition was good.

EXAMPLE 22

To the same acrylic resin as that obtained in Example 20 were added 40 parts of EHPE-3150 solution obtained by dissolving 25 parts of EHPE-3150 (epoxidated polyvinyl-cyclohexene oxide, epoxy equivalent: 190, number average molecular weight: 1,500; trade name for a product by DAICEL CHEMICAL INDUSTRY CO., LTD.) and 20 parts of a toluene solution having dissolved therein 3 parts of aluminum benzoylacetonate to obtain a composition of Example 22. Then, the composition was coated on a tinplate and baked at 160° C. for 20 minutes to obtain a coating film having a thickness of 40 μm, a gel fraction (*6) of 94%, a coating surface smoothness (*2) being good, and a flexing resistance (*5) being acceptable. The storage stability (*1) of the composition was good.

COMPARATIVE EXAMPLE 4

Procedures of Example 19 were repeated except that acrylic acid in Example 19 was replaced by ethyl acrylate to obtain a composition. The composition was coated and treated in the same manner as in Example 19 to obtain a coating film. As a result, the coating film had a gel fraction (*6) of 76% and a flexing resistance being unacceptable.

COMPARATIVE EXAMPLE 5

Procedures of Example 21 were repeated except that 7 parts of methacrylic acid and 20 parts of hydroxyethyl methacrylate were replaced by 20 parts of methacrylic acid and 7 parts of hydroxyethyl methacrylate, respectively, to obtain a composition. The resulting coating film had a coating surface smoothness (*2) being good before storage stability (*1) test but after the test the surface of the coating film was rough, thus having a poor smoothness (This indicated that after baking no flowability was observed, which confirmed that the composition was gelled.

Next, explanation will be made on examples and comparative examples of multi-layer top coat coating films obtained by forming a clear top coat on a pigmented base coat.

Coating Compositions (I-1) to (I-12) for Pigmented Base Coat

Coating compositions for pigmented base coat were obtained by blending base resins with aluminum paste in blend ratios shown in Table 4. Aluminum paste (ALPASTE 1109MA, trade name for a product by TOYO ALUMI INDUSTRY CO., LTD., 75% aluminum powder) was dispersed in an organic solvent solution of the base resin.

TABLE 4

| Coating Composition for Pigmented Base Coat | Coating Composition | Blend Ratio of Coating of Composition (Solid Content) | Aluminum Paste |
|---|---|---|---|
| I-1 | Example 1 | 100 | 15 |
| I-2 | Comparative Example 1 | 100 | 15 |
| I-3 | Example 7 | 100 | 15 |
| I-4 | Example 8 | 100 | 15 |

TABLE 4-continued

| Coating Composition for Pigmented Base Coat | Coating Composition | Blend Ratio of Coating of Composition (Solid Content) | Aluminum Paste |
|---|---|---|---|
| I-5 | Example 9 | 100 | 15 |
| I-6 | Example 10 | 100 | 15 |
| I-7 | Example 11 | 100 | 15 |
| I-8 | Example 12 | 100 | 15 |
| I-9 | Example 19 | 100 | 15 |
| I-10 | Example 22 | 100 | 15 |
| I-11 | Comparative Example 2 | 100 | 15 |
| I-12 | Comparative Example 4 | 100 | 15 |

Preparation examples of resins for coating compositions for clear top coat:

| Resin Composition (a) | |
|---|---|
| Methyltrimethoxysilane | 2,720 parts |
| -Methacryloxypropyl-trimethoxysilane | 256 parts |
| Deionized water | 1,134 parts |
| 30% Hydrochloric acid | 2 parts |
| Hydroquinone | 1 part |

A mixture of the above substances was reacted at 80° C. for 5 hours to obtain a polysiloxane type macromonomer. The macromonomer had a number average molecular weight of 2,000 and also had on average one vinyl group (polymerizable unsaturated bond) and four hydroxyl groups per molecule.

| Then, a mixture of the following: | |
|---|---|
| Polysiloxane type macromonomer | 100 parts |
| 2-Hydroxyethyl acrylate | 100 parts |
| 3,4-Epoxycyclohexylmethyl methacrylate | 200 parts |
| 2-Ethylhexyl methacrylate | 500 parts |
| Styrene | 100 parts |
| Azobisisobutyronitrile | 50 parts | was dropwise added to 1,000 parts of a mixture of butanol and xylene (1:1 by weight) at 120° C. to obtain a resin composition (a). The resin thus obtained had a number average molecular weight of about 10,000.

| Resin (b) A mixture of the following: | |
|---|---|
| γ-Methacryloxypropyl-trimethoxysilane | 100 parts |
| 2-Hydroxyethyl acrylate | 100 parts |
| 3,4-Epoxycyclohexylmethyl methacrylate | 200 parts |
| 2-Ethylhexyl methacrylate | 500 parts |
| Styrene | 100 parts |
| Azobisisobutyronitrile | 50 parts | was dropwise added to 1,000 parts of mixture of butanol and xylene (1:1 by weight) at 120° C. to obtain a resin composition (b). The resin thus obtained had a number average molecular weight of about 9,000.

| Resin (c) A mixture of the following: | |
|---|---|
| The above polysiloxane type macromonomer | 200 parts |

-continued

| Resin (c) A mixture of the following: | |
|---|---|
| 2-Hydroxyethyl acrylate | 100 parts |
| 2-Ethylhexyl methacrylate | 500 parts |
| Styrene | 200 parts |
| Azobisisobutyronitrile | 50 parts | was dropwise added to 1,000 parts of mixture of butanol and xylol (1:1 by weight) at 120° C. to obtain a resin composition (c). The resin thus obtained had a number average molecular weight of about 10,000.

| Resin (d) A mixture of the following: | |
|---|---|
| γ-Methacryloxypropyl trimethoxysilane | 200 parts |
| 2-Hydroxyethyl methacrylate | 100 parts |
| 2-Ethylhexyl methacrylate | 500 parts |
| Styrene | 200 parts |
| Azobisisobutyronitrile | 50 parts | was dropwise added to 1,000 parts of a mixture of butanol and xylol (1:1 by weight) at 120° C. to obtain a resin composition (d). The resin thus obtained had a number average molecular weight of about 9,000.

| Resin (e) A mixture of the following: | |
|---|---|
| 3,4-Epoxycyclohexylmethyl methacrylate | 400 parts |
| 2-Hydroxyethyl methacrylate | 100 parts |
| 2-Ethylhexyl methacrylate | 400 parts |
| Styrene | 100 parts |
| Azobisisobutyronitrile | 50 parts | was dropwise added to 1,000 parts of a mixture of butanol and xylene (1:1 by weight) at 120° C. to obtain a resin composition (e). The resin thus obtained had a number average molecular weight of about 9,000.

| Resin (f) A mixture of the following: | |
|---|---|
| 2-Hydroxyethyl methacrylate | 100 parts |
| 2-Ethylhexyl methacrylate | 400 parts |
| Styrene | 100 parts |
| Methyl methacrylate | 400 parts |
| Azobisisobutyronitrile | 50 parts | was dropwise added to 1,000 parts of a mixture of butanol and xylene (1:1 by weight) at 120° C. to obtain a resin composition (f). The resin thus obtained had a number average molecular weight of about 9,000.

COATING COMPOSITION (II-1) to (II-5) for Clear Top Coating

Coating compositions for clear top coat were obtained by blending resin composition with catalyst in blend ratios shown in Table 5.

Coating Composition (II-6)

The same coating composition as in Comparative Example 1 above was used.

TABLE 5

| | Coating Composition for Clear Top Coat | | | | |
|---|---|---|---|---|---|
| | II-1 | II-2 | II-3 | II-4 | II-5 |
| Resin Composition | | | | | |
| Type | a | b | c | d | c |
| Amount (parts) | 100 | 100 | 50 | 50 | 20 |
| Type | | | e | e | e |
| Amount (parts) | | | 50 | 50 | 40 |
| Type | | | | | f |
| Amount (parts) | | | | | 40 |
| Catalyst | | | | | |
| Type | Aluminum tris(acetylacetonate) | | | | |
| Amount (parts) | 1.0 | | | | |

Preparation of Coated Plates

An epoxy resin type cationic electrodeposition coating composition was coated on dull steel plates (zinc phosphate-treated) in a thickness of 25 μm, and thermally cured at 170° C. for 30 minutes. Thereafter, as an intercoat, RUGER BAKE AM (trademark for a coating composition for cars of polyester resin/melamine resin type, produced by KANSAI PAINT CO., LTD.) was coated to a dry film thickness of 30 μm, and baked at 140° C. for 30 minutes. Then, the coated surface was water ground with #400 sand paper, hydro-extracted and dried, and wiped with petroleum benzene. The thus obtained coated plates were used as a material.

Next, the coating compositions for pigmented base coat shown in Table 6 were spray coated on the above materials separately to a dry film thickness of about 15 to 20 μm, and then after 3 minute interval the coating compositions for clear top coat shown in Table 6 were spray coated on the thus coated materials separately to a dry film thickness of about 35 to 45 μm. Subsequently, the coated materials were left at room temperature for 10 minutes and baked at 100° C. for 30 minutes (for recoated type: 140° C. for 30 minutes). Performances and appearance of coating films were evaluated and result are shown in Table 6.

TABLE 6

| | EX. 1 | Ex. 2 | Ex. 3 | Ex. 4 | Ex. 5 | Ex. 6 | Ex. 7 | Ex. 8 | Ex. 9 | EX. 10 | Ex. 11 | Ex. 12 | Ex. 13 | Comparative Ex. 1 | Ex. 2 | Ex. 3 |
|---|---|---|---|---|---|---|---|---|---|---|---|---|---|---|---|---|
| Coating Composition for Pigmented Base Coat | I-1 | I-3 | I-3 | I-3 | I-3 | I-3 | I-4 | I-5 | I-6 | I-7 | I-8 | I-9 | I-10 | I-2 | I-11 | I-3 |
| Coating Composition for Clear Top Coat | II-1 | II-1 | II-2 | II-3 | II-4 | II-5 | II-1 | II-1 | II-1 | II-1 | II-1 | II-1 | II-1 | II-1 | II-1 | II-6 |
| Appearance and Performance of Coating Film | | | | | | | | | | | | | | | | |
| Appearance (*7) | AB | A | A | AB | AB | AB | A | A | A | A | A | AB | AB | C | C | C |
| Imag Clarity (*8) | 79 | 85 | 86 | 80 | 79 | 78 | 85 | 85 | 86 | 86 | 86 | 79 | 78 | 35 | 28 | 25 |
| Metalic | A | A | A | A | A | A | A | A | A | A | A | A | A | C | C | C |

TABLE 6-continued

| | EX. 1 | Ex. 2 | Ex. 3 | Ex. 4 | Ex. 5 | Ex. 6 | Ex. 7 | Ex. 8 | Ex. 9 | EX. 10 | Ex. 11 | Ex. 12 | Ex. 13 | Comparative Ex. 1 | Ex. 2 | Ex. 3 |
|---|---|---|---|---|---|---|---|---|---|---|---|---|---|---|---|---|
| Feeling (*9) | | | | | | | | | | | | | | | | |
| Water Resistance (*10) | B | A | A | B | B | B | A | A | A | A | A | B | B | D | D | D |
| Recoatability (*11) | A | A | A | A | A | A | A | A | A | A | A | A | A | C | C | B |

Test Methods
(*7): Appearance; Bubble and shrink of coating films were examined.
A: Normal
B: Bubble and shrink observed slightly
C: Many bubble and shrink observed
(*8): Image sharpness; Image clarity was measured using a tester IMAGE CLARITY METER (produced by SUGA SHIKENKI CO., LTD.).
In Table 6, numerals showing ICM values (o to 100%) obtained by the tester, greater numbers indicating better image sharpness (image clarity), with ICM values higher than 80 meaning excellent image sharpness.
(*9): Metallic feeling; Feeling of brightness and whiteness of metals were evaluated visually.
A: Feeling of brightness and whiteness present
B: No feeling of brightness, whiteness being poor
C: Completely no feeling of brightness, nor whiteness.
(*10): Water resistance; After dipping test coated plates in water at 40° C. for 240 hours, their swelling was evaluated visually.
A: Normal
B: Slightly swelled
C: Considerably swelled
D: Markedly swelled
(*11): Recoatability; The same coating compositions for base coat and clear top coat as examples and comparative examples were coated on already coated surfaces and baked at 120° C. for 30 minutes to obtain coating films. The thus obtained coating films were cross-cut with a knife, and an adhesive tape was attached thereon, followed by abrupt peeling off. This procedure was repeated twice, and adhesion strength between the coated films were evaluated with comparing results obtained in the first and second peeling-off tests.
A: No peeling-off
B: Slight peeling-off
C: Marked peeling-off

What is claimed is:
1. A thermosetting coating composition comprising as essential components:
(a) a base resin containing both hydroxyl and carboxyl groups and having an acid value in the range of about 1 to about 100 and a hydroxyl value in the range of about 10 to about 500.
(b) an alicyclic polyepoxide crosslinking agent selected from the group consisting of compounds of the formula:

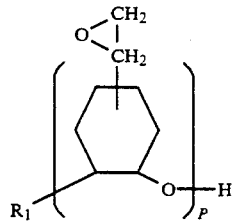

wherein $R_1$ is an organic residue having an active hydrogen, and p is 2 to 100;
said compounds having a number average molecular weight in the range of about 700 to about 50,000; and
(c) a catalyst selected from the group consisting of quaternary ammonium hydroxide of the formula:

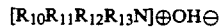

wherein $R_{10}$, $R_{11}$, $R_{12}$ and $R_{13}$, which are the same or different, each represent a monovalent hydrocarbon group.

2. The composition as claimed in claim 1, wherein said base resin (a) is a hydroxyl and carboxyl groups containing vinyl resin.
3. The composition as claimed in claim 1, wherein said base resin (a) has hydroxyl functionality in the range of about 10 to about 500.
4. The composition as claimed in claim 1, wherein said base resin containing both hydroxyl and carboxyl groups is a hydroxyl and carboxyl groups containing vinyl resin.
5. The composition as claimed in claim 1, wherein said base rein (a) has a number average molecular weight in the range of about 1,000 to about 100,000.
6. The composition as claimed in claim 1, wherein said base resin (a) has a flex temperature of no higher than 130° C.
7. The composition as claimed in claim 1, wherein said alicyclic polyepoxide crosslinking agent (b) has a softening temperature of no higher than 130° C.
8. The composition as claimed in claim 1, wherein said base resin (a) occupies 40 to 97% by weight and said alicyclic polyepoxide crosslinking agent (b) occupies 3 to 60% by weight based on sum of said base resin (a) and said crosslinking agent (b).
9. The composition as claimed in claim 1, wherein said quaternary ammonium hydroxide is a tetralkylammonium hydroxide.
10. The composition as claimed in claim 1, wherein said catalyst (c) is contained in an amount of 0.01 to 10 parts by weight per 100 parts by weight of sum of said base rein (a) and said alicyclic polyepoxide crosslinking agent (b).
11. The composition as claimed in claim 1, wherein said composition is an aqueous composition dispersion in which said base resin (a), said crosslinking agent (b) and said catalyst (c) are dissolved or dispersed in water.

* * * * *